US011091393B2

(12) United States Patent
Kajita

(10) Patent No.: US 11,091,393 B2
(45) Date of Patent: Aug. 17, 2021

(54) SURFACE MODIFICATION OF CLAY

(71) Applicant: Oil-Dri Corporation of America, Chicago, IL (US)

(72) Inventor: Laura Kajita, Chicago, IL (US)

(73) Assignee: Oil-Dri Corporation of America, Chicago, IL (US)

( * ) Notice: Subject to any disclaimer, the term of this patent is extended or adjusted under 35 U.S.C. 154(b) by 0 days.

(21) Appl. No.: 16/247,965

(22) Filed: Jan. 15, 2019

(65) Prior Publication Data

US 2019/0225541 A1 Jul. 25, 2019

Related U.S. Application Data

(60) Provisional application No. 62/619,222, filed on Jan. 19, 2018.

(51) Int. Cl.
| | |
|---|---|
| *C04B 14/10* | (2006.01) |
| *C04B 28/04* | (2006.01) |
| *C04B 20/00* | (2006.01) |
| *C04B 24/42* | (2006.01) |
| *B01J 20/22* | (2006.01) |
| *C04B 18/02* | (2006.01) |

(Continued)

(52) U.S. Cl.
CPC ............. *C04B 14/10* (2013.01); *B01D 53/04* (2013.01); *B01J 20/22* (2013.01); *C02F 1/40* (2013.01); *C04B 18/021* (2013.01); *C04B 20/008* (2013.01); *C04B 24/42* (2013.01); *C04B 28/04* (2013.01); *C09K 8/467* (2013.01)

(58) Field of Classification Search
CPC ....... C04B 14/047; C04B 14/08; C04B 14/10; C04B 14/102; C04B 14/104; C04B 14/106; C04B 14/28; C04B 2/02; C04B 7/34; C04B 7/02; C04B 18/021; C04B 20/0016; C04B 28/04; C04B 28/10; C04B 39/00; C04B 14/042; C01B 33/28; B01D 17/0202; B01D 2257/702; B01J 20/00; B01J 20/10; B01J 20/12; B01J 20/16; B01J 20/22; C02F 1/40; C02F 2101/32; C02F 2101/325

See application file for complete search history.

(56) References Cited

U.S. PATENT DOCUMENTS

| | | | | |
|---|---|---|---|---|
| 3,948,830 A | * | 4/1976 | Donnelly | ................ C08L 63/00 523/401 |
| 4,206,080 A | | 6/1980 | Sato et al. | |

(Continued)

OTHER PUBLICATIONS

Encyclopædia Britannica Online. "Portland cement". Encyclopædia Britannica Inc.. Accessed from <https://web.archive.org/web/20150905141011/https://www.britannica.com/technology/portland-cement> (Year: 2015).*

(Continued)

*Primary Examiner* — Jennifer A Smith
*Assistant Examiner* — Amanda Garley
(74) *Attorney, Agent, or Firm* — Vedder Price, P.C.

(57) ABSTRACT

The present invention involves a granular product to remove oil and grease from oily waste water; specifically targeting produced/flow-back water generated in the offshore oilfield industry. This granular product may be loaded into either filter media canisters or bulk filtration vessels and used onsite to filter the water. This invention may also be used as a pre-treatment step to other polishing filter systems.

18 Claims, 17 Drawing Sheets

(51) Int. Cl.
*B01D 53/04* (2006.01)
*C02F 1/40* (2006.01)
*C09K 8/467* (2006.01)

(56) References Cited

U.S. PATENT DOCUMENTS

| | | |
|---|---|---|
| 4,481,113 A | 11/1984 | Canevari |
| 4,497,688 A | 2/1985 | Schaefer |
| 5,409,984 A * | 4/1995 | Gerhardinger ......... C08K 3/346 |
| | | 524/442 |
| 2004/0121916 A1 * | 6/2004 | Kono ...................... E02D 17/18 |
| | | 507/100 |
| 2009/0137384 A1 | 5/2009 | Katay |
| 2011/0303156 A1 * | 12/2011 | Sikka .................... A01K 29/00 |
| 2013/0284069 A1 * | 10/2013 | Dubey ................. C04B 12/005 |
| | | 106/695 |
| 2018/0290125 A1 * | 10/2018 | Beall ................. B01D 17/0202 |
| 2019/0150396 A1 * | 5/2019 | Li ........................ A01K 1/0152 |

OTHER PUBLICATIONS

Michael Chusid, "Metakaolin: The Pozzolan for Decorative Concrete", Accessed from <https://www.concretedecor.net/decorativeconcretearticles/vol-5-no-1-februarymarch-2005/mighty-metakaolin/> (Year: 2005).*

Marek Osacky, "Influence of Nonswelling Clay Minerals (Illite, Kaolinite, and Chlorite) on Nonaqueous Solvent Extraction of Bitumen ", Energy Fuels 2015, 29, 4150-4159 (Year: 2015).*

International Search Report issued in connection with PCT/US2019/013628 dated May 3, 2019; 2 pages.

* cited by examiner

Cement Mixer
(Batch)

Paddle Mixer
(Continuous)

COLUMN TESTING:
- STOCK SOLUTION-250 ppm-300 ppm CRUDE OIL
- MECHANICALLY EMULSIFIED SIMULATED SEA WATER (4% SEA WATER SALT)
- BED VOLUME CONSTANT FOR ALL SAMPLES
- HORIBA OCMA 350 OIL & GREASE ANALYZER
- COLUMNS SHUTDOWN FOR NIGHT - NOT DRAINED IN-SITU COLUMN REGENERATION:
- REGENERATION SOLVENT: n-HEXANES
- 3-BED VOLUMES OF HEXANES PUMPED THROUGH COLUMN
- MEDIA DRIED BY DRAWING AIR THROUGH COLUMN
- TESTING RESUMED
- CRUDE OIL RECLAIMED BY EVAPORATING SOLVENT OFF

FIG. 2A

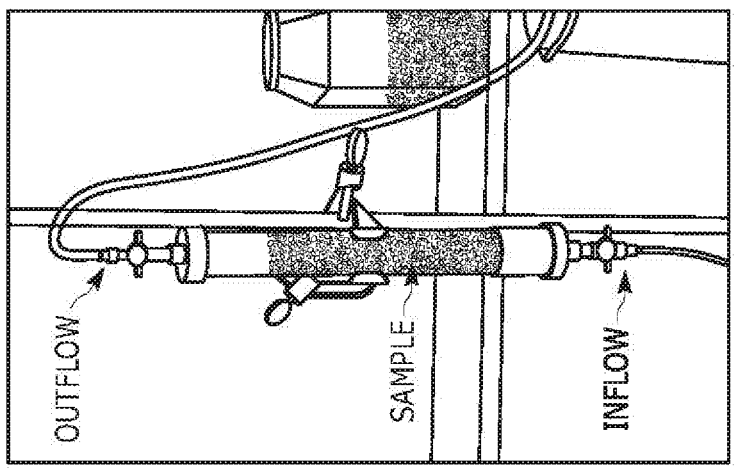

Step 1: Starting Vessel

Step 6: Mesh on Top Sample Prototype

Step 2: Mesh Lower Base Opening

Step 7: Top Gravel Layer

Step 3: Base Gravel Layer

Step 8: Mesh on Top Gravel

Step 4: Mesh on Top Base Gravel

Final Filled vessel

Step 5: Fill with Sample Prototype

ODC Prototype Start

ODC Prototype End

Granule Integrity

SURFACE MODIFICATION OF CLAY

RELATED APPLICATIONS AND INCORPORATION BY REFERENCE

This application claims benefit of and priority to U.S. provisional patent application Ser. No. 62/619,222 filed Jan. 19, 2018 and entitled "SURFACE MODIFICATION OF CLAY."

The foregoing application and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to the use of a granular product which removes hydrocarbons that are contained in water. The invention also gives the option to recover or reclaim the oil the invention removes from the water.

BACKGROUND OF THE INVENTION

Industrial processing has historically resulted in challenges with generating waste water. Industrial waste water can contain various contaminants including metals, surfactants, suspended and dissolved solids, organics, and hydrocarbons (oil and grease). Hydrocarbons are common in many waste streams from various oil drilling/production, refining, storage, and transportation industries and there are multiple technologies for treating the waste steams (Ahmed et al., J. Hazard. Mater., 141(2007), pp. 557-564; Machin-Ramirez et al., Chemosphere, 70 (2008), pp. 737-744; Chen and He, Sep. Purif. Technol., 31 (2003), pp. 83-89). Hydrocarbon wastewater pollution is of concern in the following aspects: (1) affecting drinking water and groundwater resources, endangering aquatic resources; (2) endangering human health; (3) atmospheric pollution; (4) affecting crop production; (5) destroying the natural landscape, and safety issues that arise (Poulopoulos et al., J. Hazard. Mater., 117 (2005), pp. 135-139; Hou et al., Chem. Eng., 128 (2007), pp. 169-175).

With the increase in global environmental awareness, there is a drive towards developing and implementing water treatment technologies that are more effective, efficient, and create less consumable waste products. Current water treatment methods (to remove hydrocarbons) the petroleum industry uses include mechanical and polishing. Mechanical methods involve using oil separators, centrifuges, hydrocyclones to remove the majority of the hydrocarbons from the water. To remove residual hydrocarbons, polishing technologies are utilized and can include media filters, reverse osmosis, and membrane filters. For offshore drilling operations, the EPA (Environmental Protection Agency) has restricted water discharged into the ocean to contain ≤29 ppm oil content. For those operations which generate water that contains high hydrocarbons, media filters are commonly used after mechanical separators to polish the water so that it meets EPA guidelines. The most common components used in filtration media systems include walnut shells, cellulosic filters, and activated carbon. Other media components include organically modified clays (Polymer Ventures and CETCO's CrudeSorb).

Citation or identification of any document in this application is not an admission that such document is available as prior art to the present invention.

SUMMARY OF THE INVENTION

The present invention involves a granular product which removes hydrocarbons from waste water; targeting industries that have limited options for treating large volumes of water to meet EPA requirements. These industries might include offshore oil production, gas and oil frac operations, and bilge water applications. Offshore applications present challenges in that large volumes of water require treatment and there is limited space and manpower available. Filtration systems must have a small footprint and be efficient so that there are minimal shutdowns due to media replacement. The invention is a granular product that is loaded into either filter media canisters or bulk filtration vessels and used onsite to filter the water after mechanical separation or as a pre-treat to other polishing systems (granular activated carbon, membrane filters). Key product objectives are effective oil removal capacities, high flow rates, longer bed life, and the ability to regenerate the material multiple times in-situ (within the cartridge or bulk vessel). Having high oil removal performance and high flow rates means the operation can process water at a fast rate and meet EPA limits. Having a longer bed life suggest the operation can operate at longer intervals. Being able to regenerate the media in-situ several times means the operator does not have replace the media as often and has less consumable waste to dispose of. Disposal fees for offshore oil operations is very high when compare to land-based operations. The operator also has the option to reclaim/recover the oil from the spent media invention as well.

Research studies have yielded several prototype formulations that have high crude oil removal, high flow rates, long bed lives, and may also be regenerated at least four times with continued high performance. In a preferred embodiment, this invention involves extruding silanes (such as Triethoxyoctylsilane) into a regular volatile material (RVM) clay powder along with Portland cement.

The invention has several differentiating features from what was previously known. The formulations of the present invention are efficient in removing hydrocarbons from water with high flow rates. The formulations of the present invention are efficiently remove hydrocarbons from acidic water and high temperature water. Unlike CrudeSorb (organoclay), the formulations of the present invention are made with non-swelling clay which results in high flow rates.

The formulations of the present invention start with RVM clay which allows maximum active sites for binding the silanes onto the clay surfaces. Other competitors start with low volatile material (LVM) clays. While others spray silanes or other organics onto the exterior of the granular base (Polymer Ventures), the formulations of the present invention use extrusion to shear the clay platelets and bind the silanes into the body of the granules.

In one embodiment, the formulation of the present invention utilizes Portland Cement to prevent slaking and maintain granule hardness/integrity in water.

In another embodiment, the formulation of the present invention utilizes water (instead of isopropyl alcohol (IPA)) to facilitate the extrusion process as well as hydrate/activate the Portland cement to form hard noodles that resist slaking. Previous formulations utilize IPA (isopropyl alcohol) which is flammable and hazardous in processing.

In another embodiment, the formulation of the present invention can be process by agglomeration (via pin-mixer, pan agglomerator, or other granulation process) into granules.

The formulation of the present invention can be regenerated at least four times—most other competitors cannot be regenerated.

This silanes extruded formulation of the present invention has higher oil removal features than other various filter media materials. This allows a customer to meet discharge limits (≤29 ppm oil and grease) and/or presents other options to the customer (such as regeneration).

The formulations of the present invention have a significantly longer bed life than the competition (walnut shells or carbon), allowing the customer to run water treatment operations longer before having to change out the media. The formulations of the present invention operate efficiently and effectively at high flow rates, allowing the customer to treat more water within a given time frame.

The formulations of the present invention may be used as a pre-treatment step to other polishing filter systems (including activated carbon and membrane filters). As a pre-treatment step, the invention removes the heavy hydrocarbons from the water before it flows through the following polishing filters where any residual hydrocarbons can be removed. The invention extends the life of the polishing filters, resulting in fewer media changeouts. Because this silanes extruded formulations of the present invention may be regenerated in-situ (inside the filtration vessel) at least four times, it allows the customer to operate longer with one load of material versus constantly changing the media and disposing of it.

After regenerating the prototype, the customer has the option of recovering the oil that was stripped from the media. This recovered oil can be sold as fuel or used for other applications. Once the prototype media is at the end of its life cycle and sees its last regeneration (and dried), it might be disposed of in a standard landfill (depending upon local regulations). Oil-spent activated carbon is very heavy and requires hazardous shipping to incinerator locations.

The formulations of the present invention may be used in other applications including treating bilge water, frac water, industrial waste water, and possibly removing other organics from water.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description, given by way of example, but not intended to limit the invention solely to the specific embodiments described, may best be understood in conjunction with the accompanying drawings.

FIG. 2A depicts column testing and in-situ column regeneration.

DETAILED DESCRIPTION OF THE INVENTION

Figure 1A:
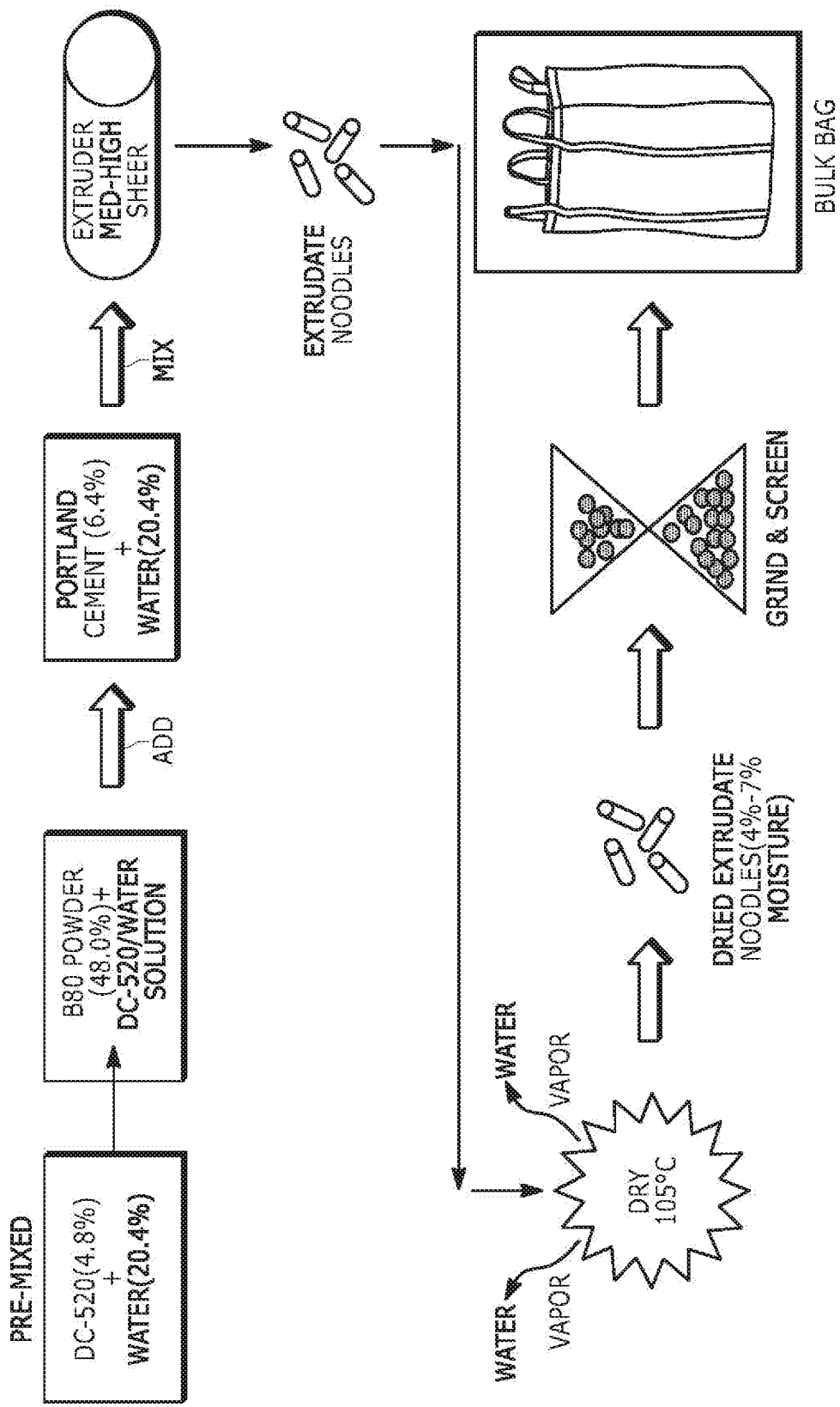
FIGS. 1A-IF depict exemplary formulations and processes.

The present invention relates to a granular composition comprising a cementing agent, a non-swelling clay, a silane and water, the manufacture thereof and uses thereof, in particular for removing hydrocarbons from water.

The cementing agent may be calcium carbonate, dolomite, lime or advantageously, a Portland cement.

Portland cement is hydraulic cement (cement that not only hardens by reacting with water but also forms a water-resistant product) produced by pulverizing clinkers which may consist essentially of hydraulic calcium silicates, usually containing one or more of the forms of calcium sulphate as an inter ground addition. Portland cement clinker is a hydraulic material which may consist of at least two-thirds by mass of calcium silicates, (3 CaO.SiO$_2$, and 2CaO.SiO$_2$), the remainder which may consist of aluminum- and iron-containing clinker phases and other compounds. The ratio of CaO to SiO$_2$ may not be less than 2.0. The magnesium oxide content (MgO) may not exceed 5.0% by mass.

The present invention contemplates use of Portland cement based concrete products, such as those, for example, manufactured by Quikrete® companies. Examples of such products include, but are not limited to:

| QUIKRETE ® Product Name | Code # |
| --- | --- |
| CONCRETE MIX | 1101 |
| FENCE POST MIX | 1005 |
| FIBER-REINFORCED CONCRETE MIX | 1006 |
| CRACK RESISTANT CONCRETE MIX | 1006-80 |
| QUIKRETE 5000 CONCRETE MIX | 1007 |
| QUIKRETE 6000 CONCRETE MIX | 1007 |
| LIGHTWEIGHT CONCRETE MIX | 1008 |
| HANDICRETE CONCRETE MIX | 1141-59, -60, -80 |
| MAXIMUM YIELD CONCRETE MIX | 1100-80 |
| B-CRETE | 1101-81 |
| PRO-FINISH QUIKRETE 5000 | 1007-85 |
| BASIC-CONCRETE MIX | 1015 |
| RIP RAP | 1129 |
| ALL-STAR CONCRETE MIX | 1121 |
| ALL-STAR CRACK RESISTANT CONCRETE MIX | 1470-03 |
| ALL-STAR 5000 CONCRETE MIX | 1470-01 |
| RED-E-CRETE CONCRETE MIX | 1101-91, -87; 1141-62, -63, -92, -93 |
| RIP RAP SCRIM | 1134-80 |
| FIBER REINFORCED DECK MIX | 1251-80, -81 |
| PRO-FINISH CRACK RESISTANT CONCRETE MIX | 1006-68 |
| COUNTERTOP MIX | 1106-80 |
| RITEMIX CONCRETE | 1171-60 |
| GREEN CONCRETE MIX | 1101-63, -73 |
| FLOWCRETE 5000 (MIX 801) | 8080026/NR80026 |

Clay may be mined in open-pit mines in Georgia/Florida, Mississippi/Tennessee, Illinois and California and other locations where similar sorptive materials are located. The mining and hauling operations are similar throughout the locations, with the exception of California. The land to be mined is first stripped. The stripping process involves removing the overburden and preparing the site to allow the excavators to reach the desired clay. When stripping is completed, the excavators dig out and load the clay onto dump trucks. The trucks haul the clay directly to our processing plants where it is dumped in a clay yard and segregated by clay type if necessary. At the California mines the clay is excavated and hauled to a hopper. An initial crushing and screening operation is performed at the mine site before the trucks are loaded for delivery to the processing plant.

The processing of the clay varies depending on the level of moisture desired in the clay after the drying process. The moisture level is referred to as regular volatile material ("RVM") or low volatile material ("LVM").

RVM Clay: A front end loader is used to load the clay from the clay yard into the primary crusher. The primary crusher reduces the clay chunks to 2.0 inches in diameter or smaller. From the crusher, the clay is transported via a belt conveyor into the clay shed. A clay shed loader feeds the clay into a disintegrator which reduces the clay to particles 0.5 inches in diameter or smaller. The clay then feeds directly into the RVM kiln. The RVM kiln reduces the clay's moisture content to <20%. From the RVM kiln, the clay moves through a series of mills and screens which further size and separate the clay into the desired particle sizes. The sized clay is then conveyed into storage tanks. The RVM processed clay can then be packaged or processed into LVM material.

LVM Clay: RVM clay is fed from storage tanks into the LVM kiln where the clay may be heat-treated at temperatures ranging from 300° C. to 900° C. The moisture content of the heat-treated granules is further reduced to <5%. The clay then proceeds into a rotary cooler, then on to a screening circuit which separates the clay into the desired particle sizes. The final LVM granules might gain some moisture with time, but be less than 10%.

Exemplary ranges of the RVM and LVM moistures and heat-treating temperatures are presented below:

| | Moisture % | Heat-Treatment ° C. |
| --- | --- | --- |
| RVM Clays | <20% | N/A |
| LVM Clays | <10% | 300-900 |
| INVENTION | <20% | N/A |

Bentonite clay is a sedimentary rock that formed millions of years ago from the alteration of siliceous sediments deposited over long geologic time spans. A particular type of this bentonite clay contains a unique combination of non-swelling minerals which are primarily calcium-montmorillonite phyllosilicates and amorphous opaline-silica lepispheres. Examples of bentonite clay include, but are not limited to, Mounds, Ripley and Blue Mountain clay.

Attapulgite, which is a hydrated magnesium-iron aluminosilicate, displays a needle-shaped mineral structure. It is a lightweight sorptive clay because of its large surface area and extensive interconnected porosity. Attapulgite crystals form the mineralogical version of Swiss cheese, where the voids in the structure can be filled with liquids of all types, allowing for the absorption of liquids and unwanted colorbodies. An example of attapulgite includes, but is not limited to, Fuller's Earth.

Diatomaceous shale is altered rock primarily made from the fossilized remains of tiny, aquatic organisms called diatoms, along with minor amounts of clay minerals. Over millions of years, these small organisms collected in the sediments of rivers, streams, lakes, and oceans, and then become deeply buried and altered into hydrous opaline aluminosilicates. Diatomaceous shale is very fine and porous. An example of diatomaceous shale includes, but is not limited to, Taft.

Advantageously, the clay is a non-swelling clay. The clay may be a Ripley, Blue Mountain, Mounds, Montmorillonite (Na+ or Ca++), Fullers Earth, Kaolin, Attapulgite or Sepiolite clay, or clay-like materials containing substantial portions of these components. Zeolites are crystalline silicates or aluminosilicates and are generally classified as tectosilicates.

In an advantageous embodiment, the clay is a fine particle size pulverized filler RVM clay which may have a particle size ranging from 1μ to 150μ (average diameter about 34μ). Advantageously, the clay is an East Georgia filler clay, such as a powdered attapulgite/montmorillonite clay (such as Georgia B-80 powder). The moisture content of this powdered clay may be <20% by weight.

Silanes refers to many compounds with four substituents on silicon, including an organosilicon compound. Examples include trichlorosilane ($SiHCl_3$), tetramethylsilane ($Si(CH_3)_4$), and tetraethoxysilane ($Si(OC_2H_5)_4$).

The silane of the present invention includes, but is not limited to, hexadecyltrimethoxysilane, ethyl silicate, tetraethyl silicate, glycidoxypropyl trimethoxysilane, organofunctional silane, octyltrimeth-oxysilane, octyltriethoxysilane or methyltrimeth-oxysilane. Advantageously, the silane is triethoxyoctylsilane.

The water of the present invention may be tap water, neutral water, purified water, acidified water, or an acidic water or may further comprise isopropyl alcohol.

The cementing agent of the present invention may comprise about 6% to about 12% by weight of the composition. The cementing agent may comprise about 4% about 5%, 6%, about 7%, about 8%, about 9%, about 10%, about 11%, about 12%, about 13% or about 14% by weight of the composition.

The non-swelling clay may comprise about 48% to about 87% by weight of the composition. The non-swelling clay may comprise about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88% or about 89% by weight of the composition.

The silane may comprise about 2% to about 5% by weight of the composition. The silane may comprise about 1c %, about 2%, about 3%, about 4%, about 5%, about 6% or about 7% by weight of the composition.

The main ingredients used in the formulation and processing of the prototypes may be as follows:

Ingredients and processing components in the prototypes.

| Formulation Ingredient | Ingredient Identity | Purpose in Formulation |
|---|---|---|
| Georgia B-80 Powder | Clay Powder | Main base clay component |
| DOW CORNING(R) 520 DILUTABLE WATER REPELLENT | Triethoxyoctylsilane $C_{14}H_{32}O_3Si$ | Increase clay hydrophobicity to attract oil |
| Portland Cement | Portland Cement | Increase granule integrity and reduce slaking in water. |
| Water | Water | Hydrate the Portland Cement and facilitate extrusion processing. |

CESSPOOL-W Formulation (Current)

| Ingredient: | Processing Formulation (% by wt.) | Finished/Dry Formulation (% by weight) |
|---|---|---|
| B80 Powder | 48.0% | 86.3% |
| Dow 520 Silanes Emusion | 4.8% | 2.2% |
| Portland Cement | 6.4% | 11.5% |
| Tap Water | 40.8% | — |
| TOTAL | 100.0% | 100.0% |

Alternative ingredients and processing components in the prototypes.

| Formulation Ingredient | Ingredient Identity | Purpose in Formulation |
|---|---|---|
| Georgia B-80 Powder | Clay Powder | Main base clay component |
| Dynasylan 9116 (Evonik) | Hexadecyltrimethoxysilane $C_{19}H_{42}O_3Si$ | Increase clay hydrophobicity to attract oil |
| TES-40 WN (Wacker Chemical) | Ethyl Silicate or Tetraethyl Silicate $(C_2H_5)_4SiO_4$ | Crosslinking agent to prevent swelling |
| Portland Cement | Portland Cement | Increase granule integrity and reduce slaking in water. |
| IPA | Isopropyl Alcohol | Solvent for silanes and ethyl silicate and wetting agent for extrusion |
| Water | Tap water | Wetting agent to activate the Portland Cement |

Alternative Process Formulations

| Process Formulation (with IPA and water)* | | Dry Formulation (without IPA and Water) | |
|---|---|---|---|
| Formulation Ingredient | Processing Content (%) | Formulation Ingredient | Processing Content (%) |
| Georgia B-80 Powder | 52.2 | Georgia B-80 Powder | 85.3 |
| Dynasylan 9116 (Evonik) | 2.4 | Dynasylan 9116 (Evonik) | 3.8 |
| TES-40 WN (Wacker Chemical) | 0.1 | TES-40 WN (Wacker Chemical) | 0.2 |
| Portland Cement | 6.5 | Portland Cement | 10.7 |
| IPA | 26.1 | Total | 100.0 |
| Water | 12.7 | | |
| Total | 100.0 | | |

Alternative Formulation Ingredients

| Formulation Ingredient | Ingredient Identity | Purpose in Formulation |
|---|---|---|
| Other Porter's Creek Clays | Ripley, Blue Mountain, & Mounds clays | Main base clay component |
| Other various clays or minerals | Montmorillonite (Na+ or Ca++), Fullers Earth, Kaolin, Attapulgite, Sepiolite, Zeolites, etc. | Main base clay component |
| Dynasylan 9116 (Evonik) | Hexadecyltrimethoxysilane $C_{19}H_{42}O_3Si$ | Increase clay hydrophobicity to attract oil |
| TES-40 WN (Wacker Chemical) | Ethyl Silicate or Tetraethyl Silicate $(C_2H_5)_4SiO_4$ | Crosslinking agent to prevent swelling |
| IPA | Isopropyl Alcohol | Solvent for silanes and ethyl silicate and wetting agent for extrusion |
| Xiameter OFS-6040 (Dow Corning) | Glycidoxypropyl trimethoxysilane | Increase clay hydrophobicity to attract oil |
| Dynasylan ® SIVO ® 850 | organofunctional silanes | Increase clay hydrophobicity to attract oil |
| Dynasylan OCTMO (Evonik) | Octyltrimethoxysilane $C_{11}H_{26}O_3Si$, | Increase clay hydrophobicity to attract oil |
| Dynasylan OCTEO (Evonik) | Octyltriethoxysilane $C_{14}H_{32}O_3Si$, | Increase clay hydrophobicity to attract oil |
| Dynasylan MTMS (Evonik) | Methyltrimethoxysilane $C_4H_{12}O_3Si$ | Crosslinking agent to prevent swelling |
| Acidic water | Water acidified (pH = 4) with acetic acid | Use as a diluent to Xiameter OFS-6040 |
| Calcium Carbonate, Dolomite, Lime | Other cementing agents | Increase granule integrity and reduce slaking in water. |

The present invention also encompasses a method of manufacturing any of the herein-disclosed compositions which may comprise mixing the cementing agent, non-swelling clay, silane and water, extruding the mixed cementing agent, non-swelling clay, silane and water, drying the extruded mixture and grinding and screening the dried extruded mixture. Extrusion is preferred since the mixture is exfoliated with a shearing motion so it is theorized that the silanes attach better.

The present invention also encompasses a method of manufacturing any of the herein-disclosed compositions which may comprise mixing the cementing agent, non-swelling clay, silane and water, agglomerating the mixed cementing agent, non-swelling clay, silane and water, drying the agglomerated mixture and grinding (if necessary) and screening the dried agglomerated mixture.

Figure 1B:
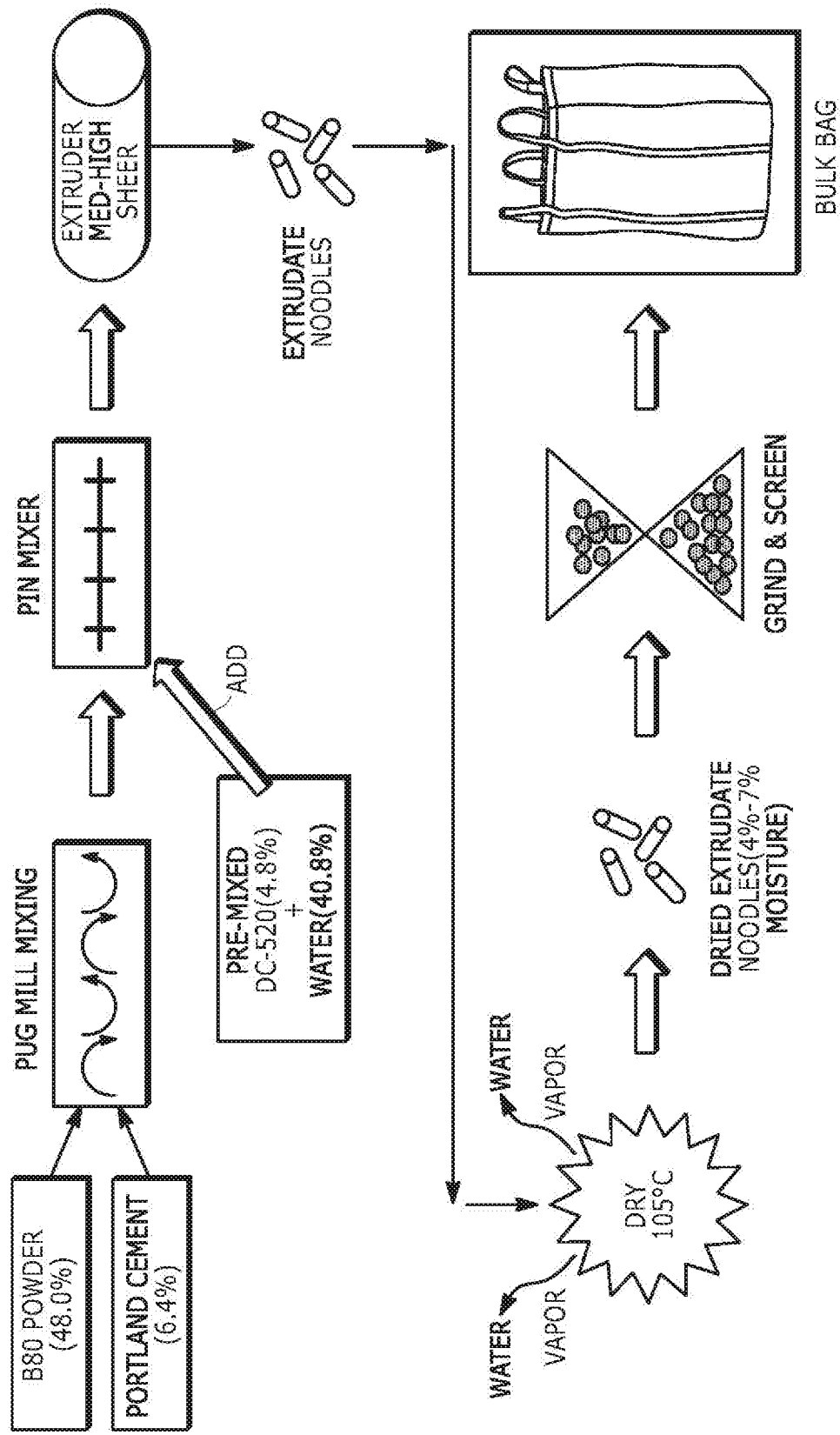

Exemplary methods are presented in FIGS. 1A-IF. The powders could be pre-mixed with water and silane added at a later time. FIG. 1A depicts a manufacturing method where DC-520 and Water are pre-mixed and then combined with B80 Powder. This mixture is then added to Portland Cement and Water, mixed together, and then extruded at medium high sheer to create extruded noodles. The noodles are then dried at an elevated temperature and then ground and screened into pellets. FIG. 1B depicts a manufacturing method where B80 Powder and Portland Cement are mixed together using a pug mill mixer and then combined with pre-mixed DC-520 and Water in a pin mixer. The resultant mixture is then extruded at a medium high sheer to create extruded noodles. The noodles are then dried at an elevated temperature and then ground and screened into pellets.

Figure 1C:
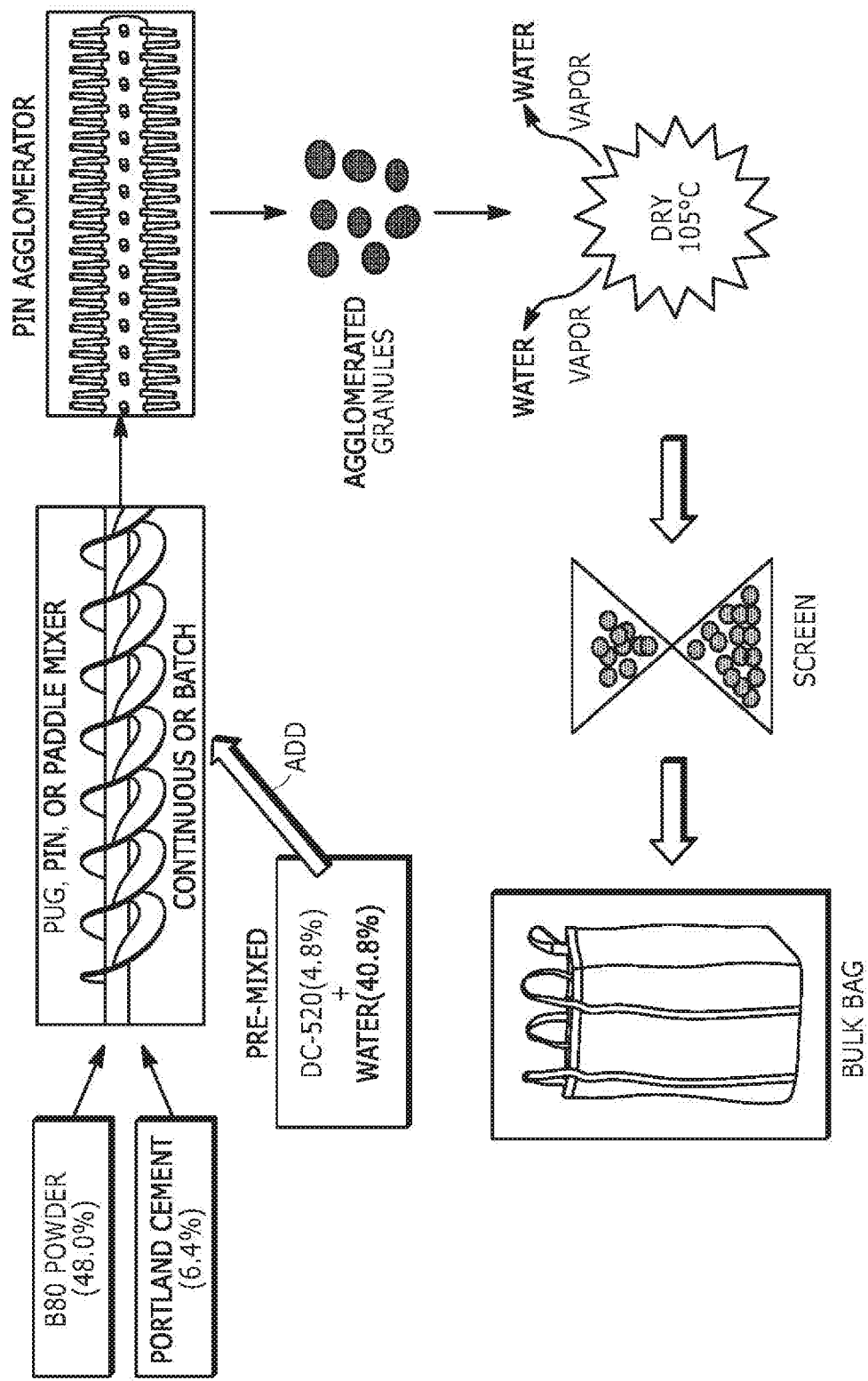
Figure 1D:
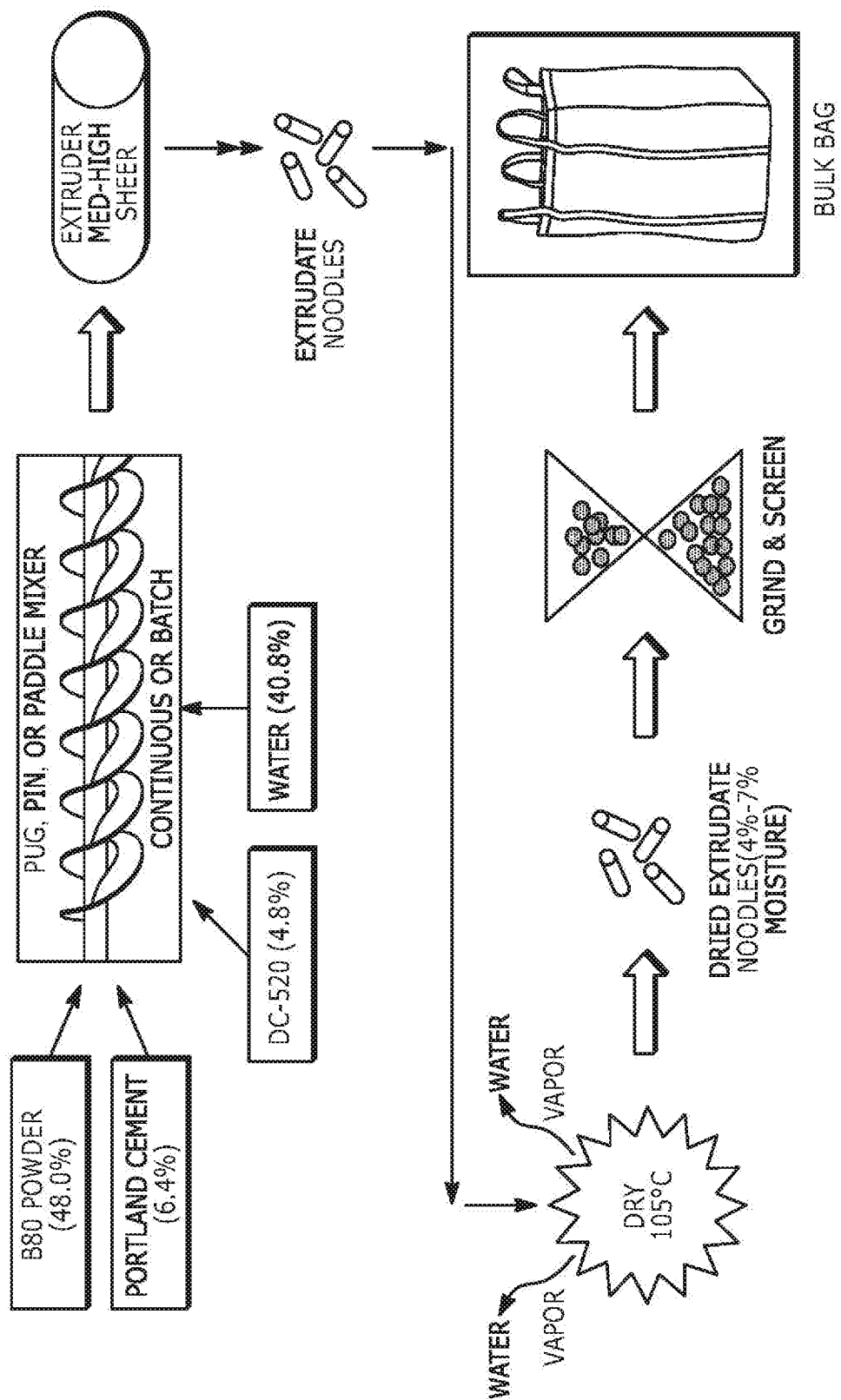
Figure 1E:
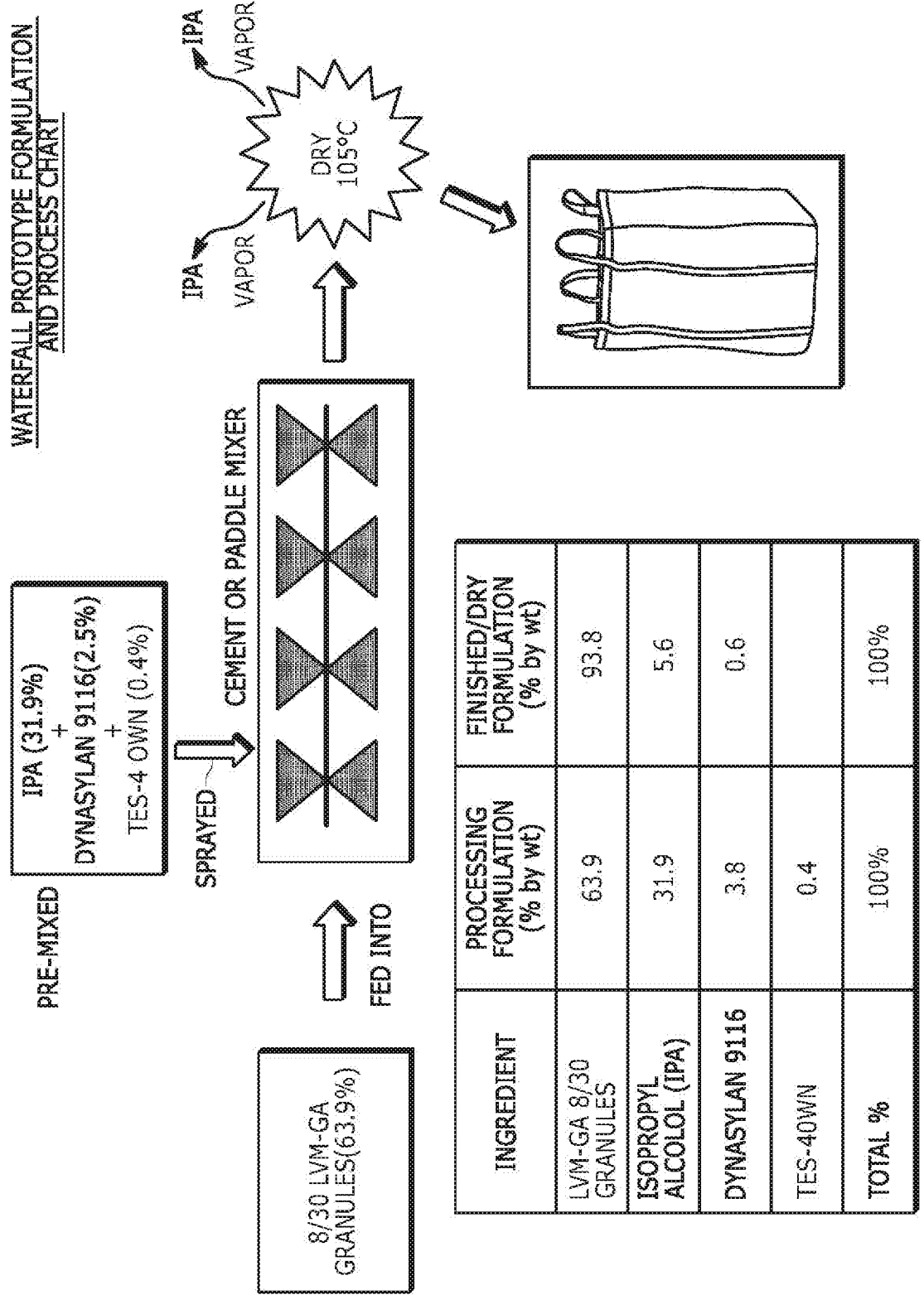
Figure 1F:
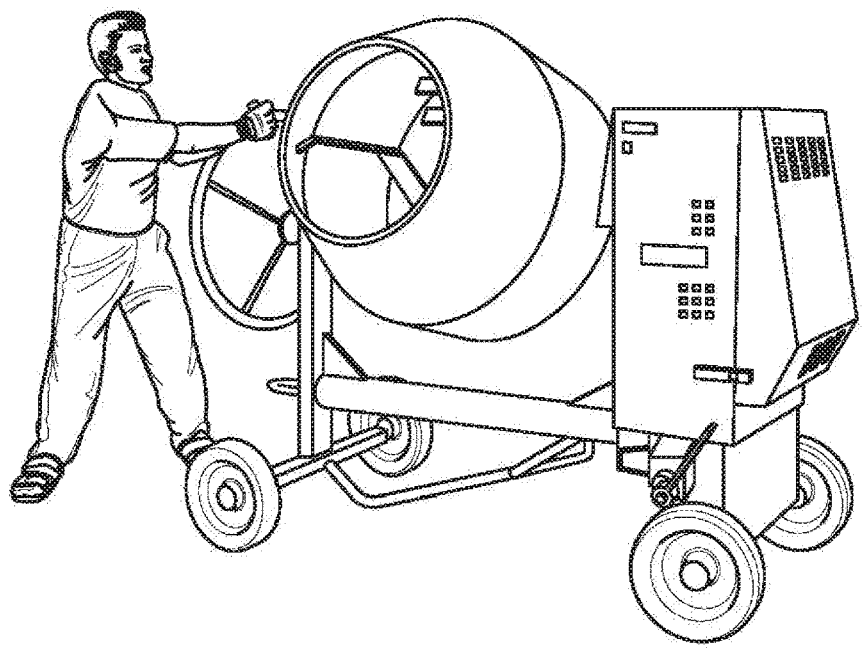
Figure 1F:
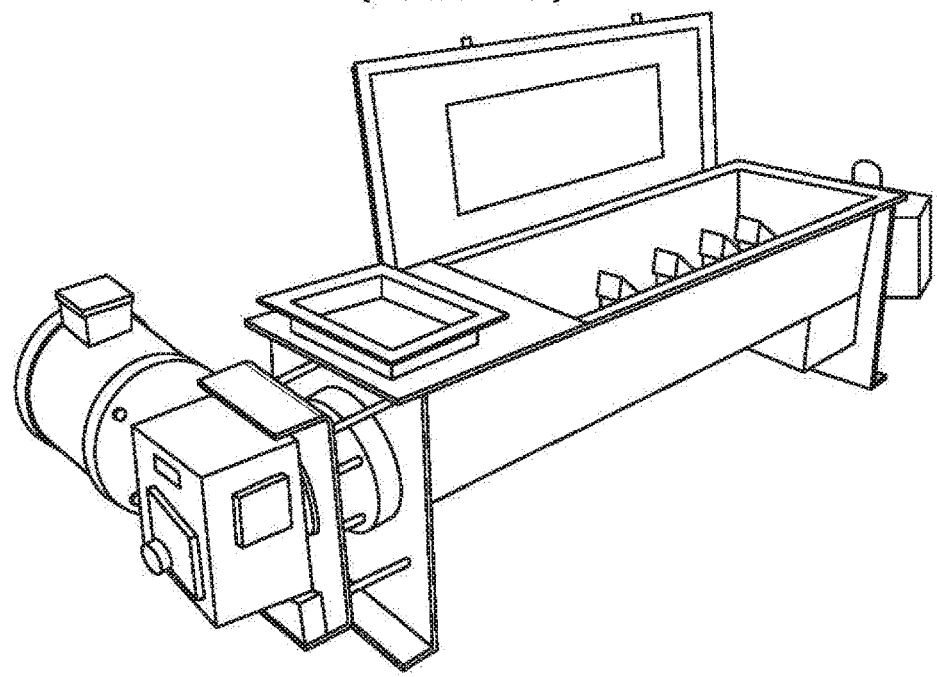

FIG. 1C depicts a manufacturing method where B80 Powder and Portland Cement are mixed together with pre-mixed DC-520 and Water using a pug, pin, or paddle mixer. The resultant mixture is then fed through a pin agglomerator to form agglomerated granules. The granules are then dried at an elevated temperature and then screened. FIG. 1D depicts a manufacturing method where B80 Powder, Portland Cement, DC-520, and Water are mixed together using a pug, pin, or paddle mixer. The resultant mixture is then extruded at a medium high sheer to create extruded noodles. The noodles are then dried at an elevated temperature and then ground and screened into pellets. FIG. 1E depicts a manufacturing method where a pre-mixture of IPA, Dynasylan, and Tes-4 Own are sprayed onto 8/30 LVM-GA Granules as they are fed into a cement or paddle mixer. The resultant mixture is then dried at an elevated temperature. FIG. 1F shows an exemplary cement mixer and an exemplary paddle mixer that may be used in accordance with these methods.

The screening may range from 3 mesh to 270 mesh with a preferred particle size ranging from about −8, +30 mesh (2300μ–600μ). The preferred particle size distribution of the finished invention is about −8, +30 mesh (2300μ–600μ). The moisture content of the preferred invention is <20% by weight.

The present invention also encompasses a method of manufacturing where a non-swelling LVM heat-treated clay granules are sprayed with a mixture of a silane and IPA (isopropyl alcohol). The granules are dried after spraying. The particle size of the starting LVM granules can range from range from 3 mesh to 270 mesh with a preferred particle size ranging from −8, +30 mesh (2300μ–600μ). The moisture content of the starting LVM granules can be <10% by weight.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1: Surface Modification of Oil-Dri Clays Thru Extrusion with Silanes and Portland Cement LABORATORY COLUMN TESTING OF PROTOTYPES: To screen various prototype formulations, column tests were conducted. These column tests involved packing the granular prototypes into small glass filtration columns (see Column Test procedure as described below). An oily water emulsion was prepared by blending water, 4-5% sea water salt, and crude oil under high shear mixing. The emulsion was then pumped through the sample columns and effluent samples were collected at various intervals to monitor the oil removal characteristics of each prototype. Flow rates through the columns were also monitored as well. The desired target specifications for the column testing included ≤29 ppm oil in treated effluent, flow rate of ≥8 mLs/minute, and a bed life of at least 300 bed volumes. A bed volume is the volume of column housing that contains the granular sample material—in these column tests, the bed volume is 55 mLs. A bed life is the amount of bed volumes of effluent that go through the column before the sample material becomes totally exhausted with oil and can no longer remove oil (also known as "failure"). Only the best candidate prototypes (exhibiting high oil removal performance, high flow rates, and long bed lives) were selected for long-termed testing. These long-termed tests involved generating the prototypes (after becoming exhausted with oil) by pumping 3 bed volumes of hexanes through the column (see Column Regenerating procedure as described below). After regenerating, testing resumed on the columns to see if the prototypes resumed their oil removal abilities. See FIG. 2A.

Column Test Results of Early ODC Prototypes versus Competition. The majority of the column testing was done on the early ODC Prototypes where Dynasylan 9116, TES-40 WN, and IPA was used in the formulations.

Figure 2B:
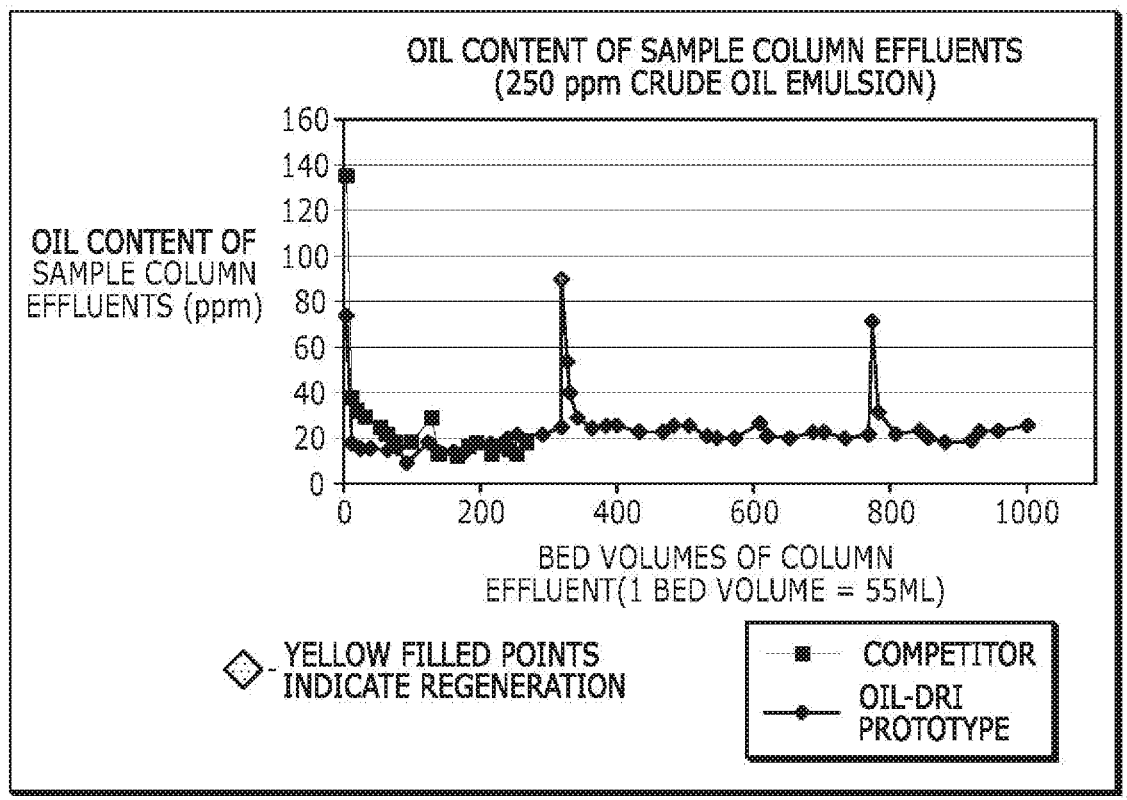
FIG. 2B depicts oil content of column effluents from Competitor and early ODC prototype.

Oil content of column effluents from Competitor and early ODC Prototype. FIG. 2B illustrates the oil content data from the Competitor and ODC Prototype samples. It can be seen that both samples are efficient at reduce the oil content from the stock emulsion solution from 250 ppm down to about 20 ppm (required specification is ≤29 ppm). However, the Competitor was only able to last to about 280 bed volumes before failure (failure determined by the sharp drop in flow rate in FIG. 2C) while the ODC Prototype lasted about 325 bed volumes before it became exhausted with oil and failed (spike in oil content). After failure, the ODC Prototype was regenerated (see Column Regeneration procedure described below) and testing was resumed. After regenerating, the Prototype resumed its high oil removal performance for another 400 bed volumes before its second failure. After regenerating the Prototype a second time, it again resumed its high oil removal performance. FIG. 2B demonstrates how the ODC Prototype not only has equal oil removal features as the competition, but it also has longer bed life and can be regenerated at least twice.

It should be noted that regeneration was attempted with the Competitor column using the Hexanes. However, the Competitor sample swelled up so much (as the hexanes were pumped through the column), that it cracked the glass column. Although the testing of the Competitor was obviously terminated at this point, the testing resumed for the regenerated ODC Prototype.

Figure 2C:
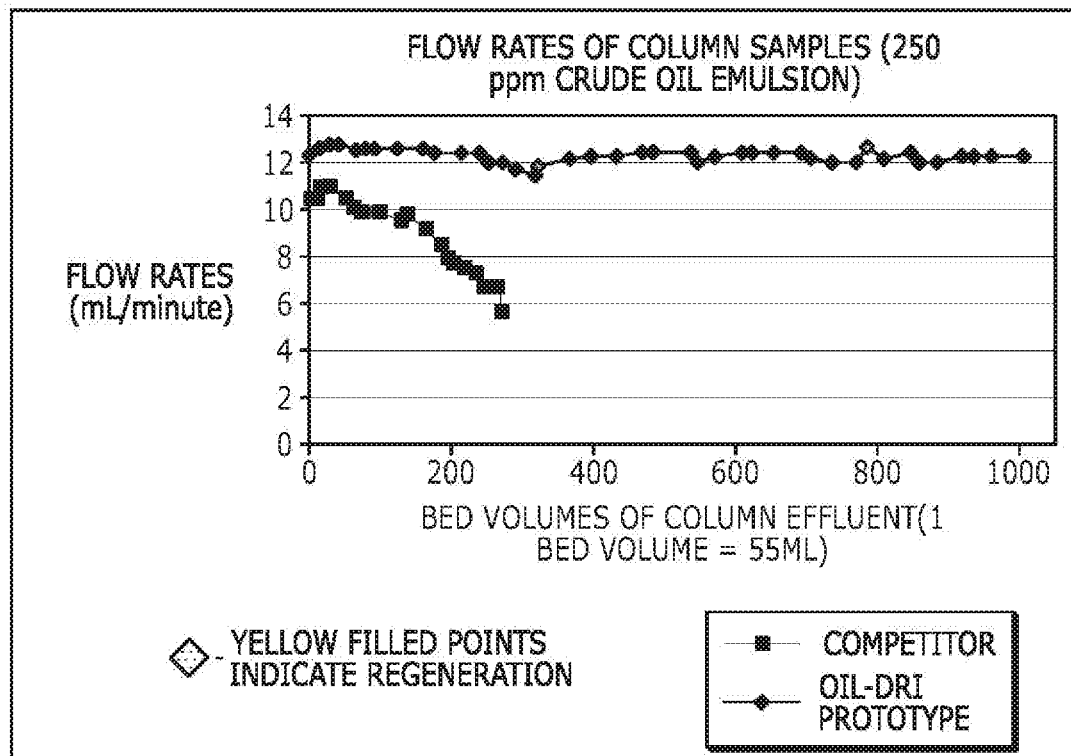
FIG. 2C depicts flow rates of column effluents from Competitor and ODC prototype.

Flow rates of column effluents from Competitor and ODC Prototype. FIG. 2C illustrates the flow rates of the Competitor and ODC Prototype samples. The desired flow rate specification was 8 mLs/minute. The data shows how the Competitor starts out at about 10 mLs/min, but then starts to decline down to about 5 mLs/min. It was at this point where the Competitor was determined to be in failure. When the Competitor column was dismantled, it was found that the material had swelled up at the inflow area, leaving the rest of the material in the rest of the column basically untouched. It is probable that the swelling up of the Competitor material was the reason why the flow rates had steadily decreased during the test run. In contrast, the flow rate of ODC Prototype was constant at about 12 mLs/min throughout the entire testing—even through its two regenerations. Dismantling the Prototype column after the test was completed, revealed the Prototype still had good granule integrity (even after two regenerations). This good granule integrity is probably why it maintained high flow rates throughout the test.

Although the ODC Prototype (using Dynasylan 9116, TES-40 WN, and IPA) yielded very positive results when compare to the competition, the formula involved using a lot of IPA in the processing. The IPA caused potential hazards in processing because of its high flammability and explosive features. The formula was modified using water-based silanes emulsions. Using the water-based silanes emulsions greatly reduced the hazardous conditions of processing while still being compatible with the Portland cement in the formula. Column testing was performed on these new "Preferred" ODC Prototypes.

Figure 2D:
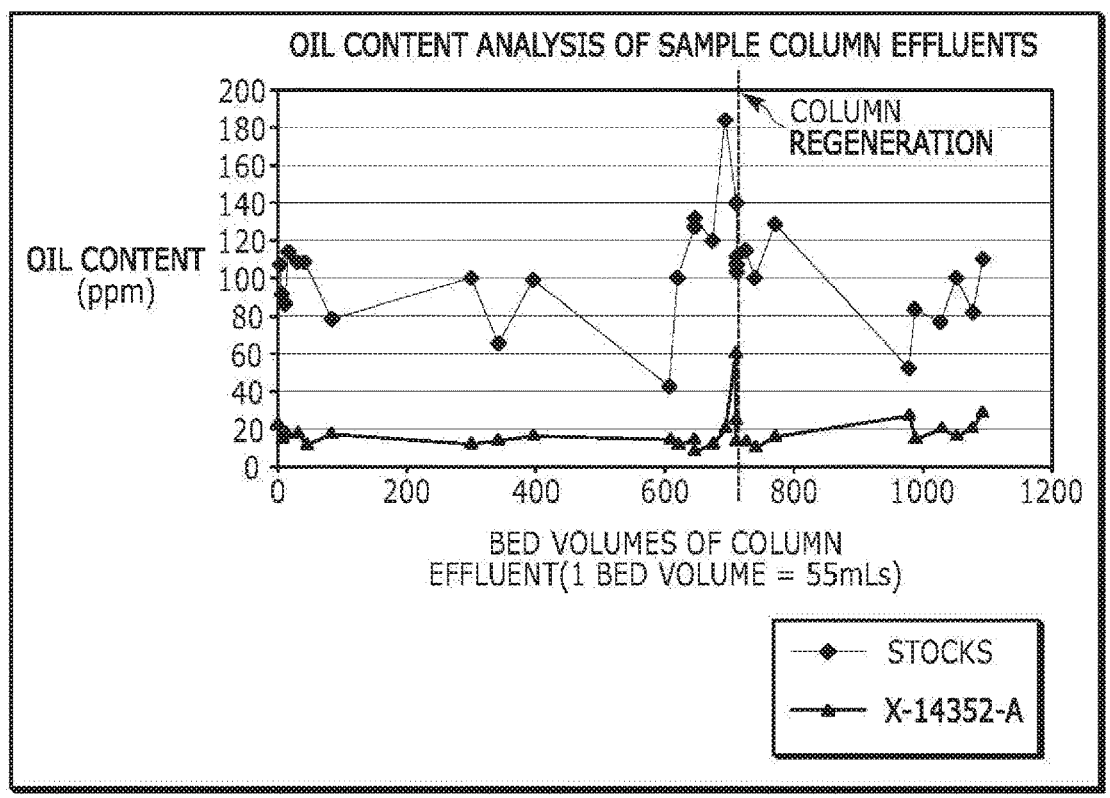
FIG. 2D depicts oil content of both stock test solution and column effluents through ODC prototype.

Column Test Results of the Current and Preferred ODC Prototype Formulation. Oil content of both stock test solution and column effluents thru ODC Prototype. FIG. 2D shows the oil content of the column effluent from the prototype X-14352-A (preferred invention) versus the starting stock solution. The prototype reduced the oil content from about an average of 100 ppm down to about 18 ppm (average), which is under the desired specification of ≤29 ppm. The prototype lasted about 700 bed volumes before it became exhausted with oil and failed. After failure, it was regenerated (see Column Regeneration procedure described below) and the testing was resumed. The prototype resumed its oil removal performance for another 400 bed volumes before the test was terminated. This testing confirmed the efficacy of the newly modified formulation (with water-based silanes emulsions).

Figure 2E:
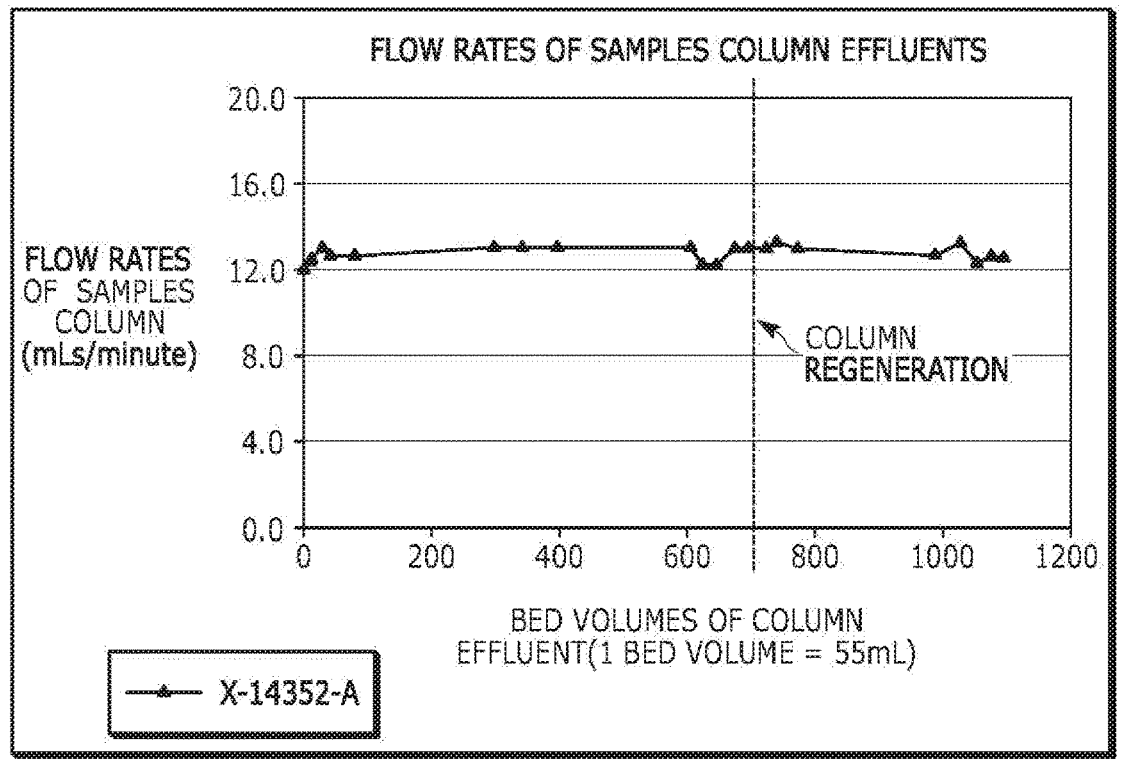
FIG. 2E depicts flow rates of effluent through the preferred ODC prototype.

Flow rates of effluent through the Preferred ODC Prototype. FIG. 2E shows the flow rates of the effluent through the prototype X-14352-A (preferred invention). As with the previous early prototypes, this preferred ODC Prototype maintains a high flow rate of approximately 12.8 mLs/min throughout the test. This suggests the granule integrity of the Prototype remained firm and intact during the test. This confirms the newly modified formulation (with water-based silanes emulsions) produces granules with high granule integrity. High flow rates allow the users to treat more water within a given time, thereby increasing efficiency.

Many flow-back water applications involve acidic water conditions. To test the preferred prototype in acidic environment applications, another column test was performed on the prototype. The crude oil stock emulsion was acidified with concentrated HCL to bring down the pH to 3-4. The acidic emulsion was pumped through the ODC Prototype under the same conditions as previous testing. The results are summarized in FIGS. 2F and 2G.

Figure 2F:
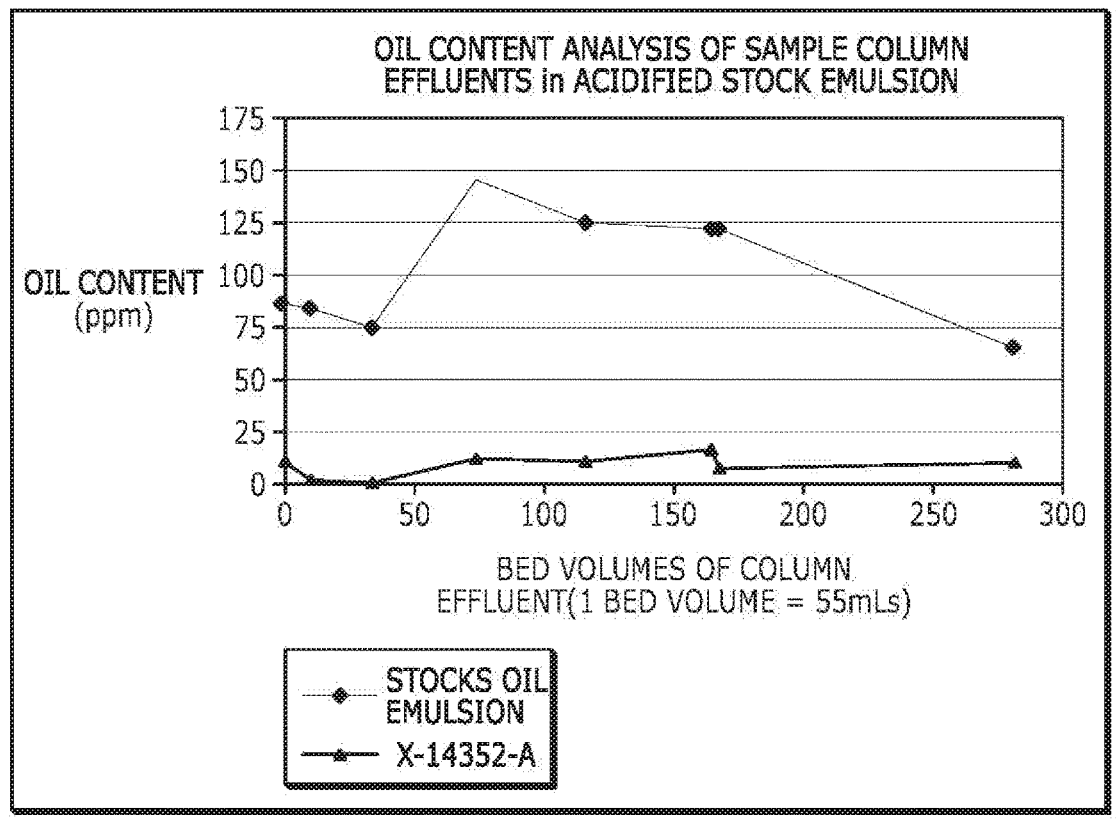
FIG. 2F depicts oil content of column effluents through preferred ODC prototype using acidified stock solution.

Oil content of column effluents thru preferred ODC Prototype using acidified stock solution. FIG. 2F shows the oil content of the column effluent from the prototype X-14352-A (preferred invention) versus the acidic starting stock solution. The prototype reduced the oil content from about an average of 104 ppm down to about 9 ppm (average), which is well under the desired specification of ≤29 ppm. The test was continued to about 280 bed volumes. It was decided not to carry the test thru failure nor regenerate it. This test confirms the prototype formulation is able remove oil from acidic water.

Figure 2G:
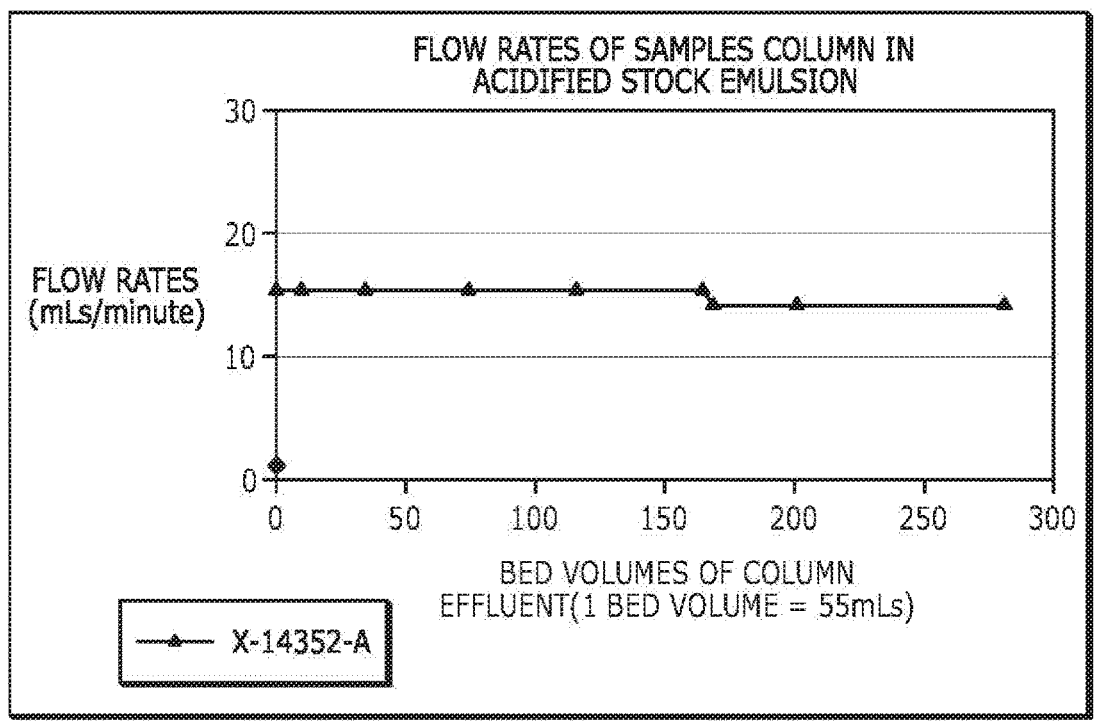
FIG. 2G depicts flow rates of ODC prototype column with acidic stock emulsion.

Flow rates of ODC Prototype column with acidic stock emulsion. FIG. 2G shows the flow rates of the acidified stock solution through the prototype X-14352-A (preferred invention). This preferred ODC Prototype maintained a high flow rate of approximately 14.7 mLs/min throughout the test. This suggests the granule integrity of the Prototype was not compromised by the acidified nature of the stock solution and remained firm and intact during the test. This confirms the newly modified formulation (with water-based silanes emulsions) produces granules that can tolerate acidic and fluids, thereby increasing the range of potential applications.

PILOT PLANT CARTRIDGE TESTING. After passing the column testing, the best candidates were selected for the next testing stage in the IC Pilot Plant. This testing involved testing the prototypes in larger-scaled cartridges. There were two cartridge sizes including 0.5 gallon and 2 gallon capacity. The crude oil emulsion was similar formulation as what was used in the column testing (80 pp-120 ppm crude oil and 4%-5% sea water salt in water). A Cowles blunger mixer was used to prepare the oil emulsion in 20 gallon batches. A pump was used to pump the stock emulsion through the cartridge. Samples were collected at regular intervals for oil content testing and flow rates were monitored. For this study, a larger sample of the preferred formulation (X-14352) was produced to accommodate the larger cartridge housing. This new sample is identified by X-15034.

Figure 2H:
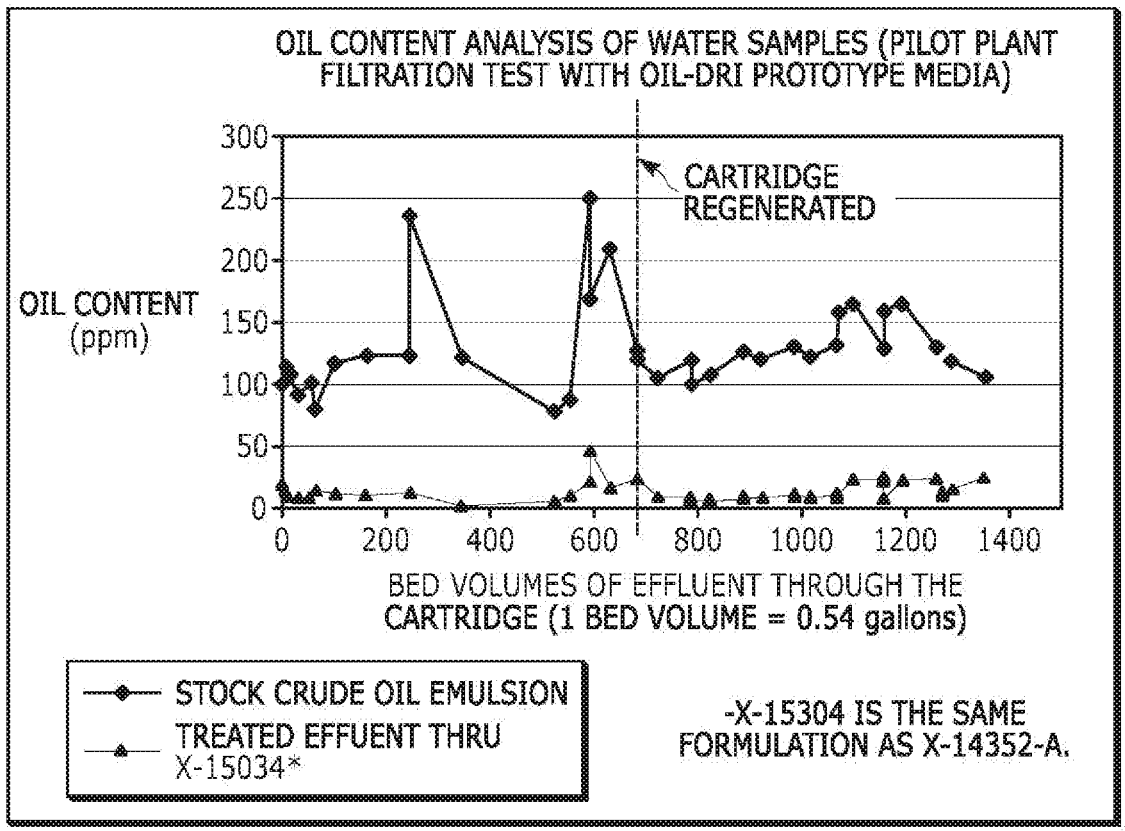
FIG. 2H depicts oil content of stock emulsion and cartridge effluents through the ODC prototype.

Pilot Plant Cartridge Testing of Preferred ODC Prototype. Oil content of stock emulsion and cartridge effluents through the ODC Prototype. FIG. 2H shows the oil content of the cartridge effluent from the ODC Prototype X-15034 (preferred invention) cartridge versus the starting stock solution. The prototype reduced the oil content from about an average of 130 ppm down to about 14 ppm (average), which is under the desired specification of ≤29 ppm. The prototype lasted about 700 bed volumes before it became exhausted with oil and failed. After failure, it was regenerated (see Column Regeneration procedure described below) and the testing was resumed. The prototype resumed its oil removal performance for another 500 bed volumes before the test was terminated due to other projects and technician availability.

Figure 2I:
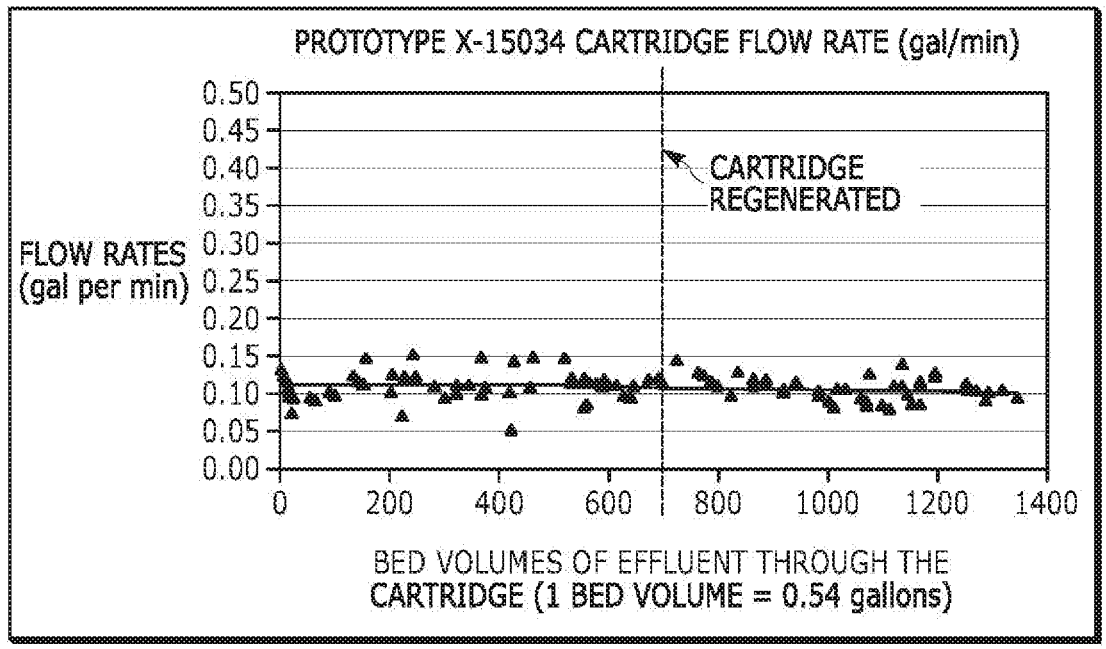
FIG. 2I depicts flow rates of the ODC prototype cartridge.

Flow rates of the ODC Prototype Cartridge. FIG. 2I shows the flow rates of the effluent through the prototype X-15034 (preferred invention). As with the previous early prototypes, this preferred ODC Prototype maintains a high average flow rate of approximately 0.1 gal/minute throughout the test. This suggests the granule integrity of the Prototype remained firm and intact during the test. High flow rates allow the users to treat more water within a given time, thereby increasing efficiency.

A regeneration study was conducted in the Pilot Plant study to see how many times the preferred ODC Prototype can be regenerated before the material was no longer effective. For this run, the larger 2 gallon capacity cartridge was used. This study spanned over several months which was a much longer time span than desired. This study used another lot of the same preferred formulation than the other studies. Also, the stock emulsion was produced with a different lot of crude oil which was quite different in nature than the old crude oil.

Figure 2J:
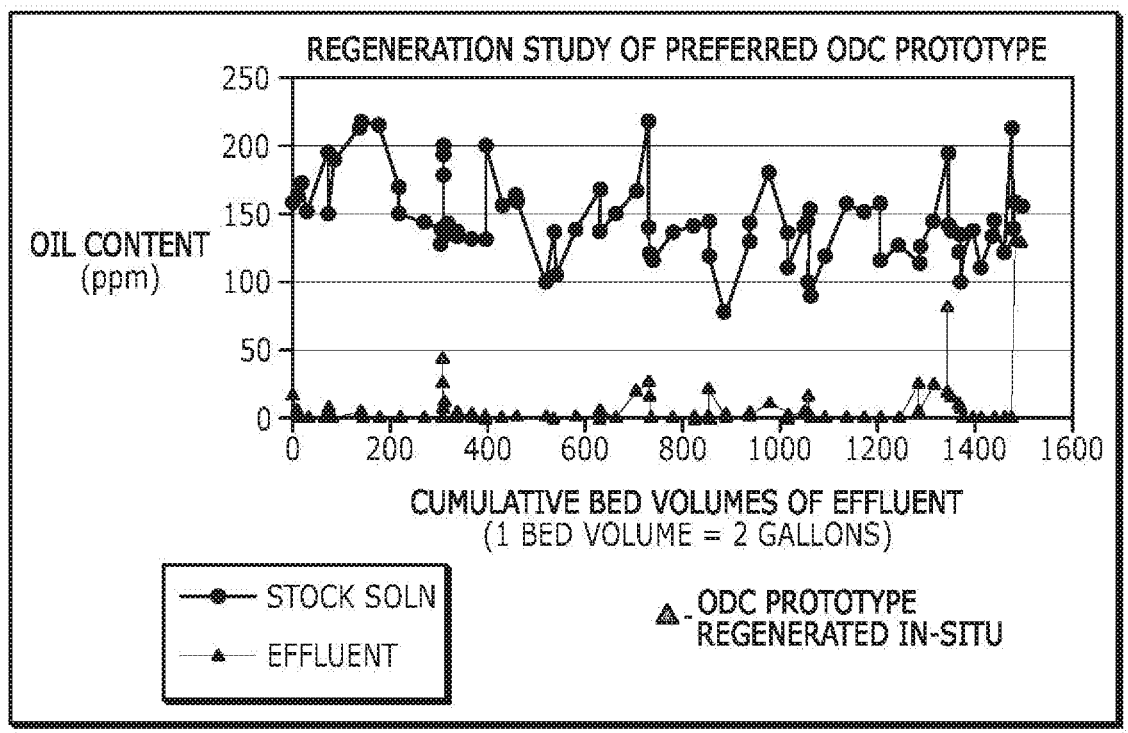
FIG. 2J depicts oil content of cartridge effluents through the preferred ODC prototype.

Pilot Plant Regeneration Study of Preferred ODC Prototype. Oil content of cartridge effluents through the Preferred ODC Prototype. FIG. 2J shows the oil content of the column effluent from the prototype X-14352-A (preferred invention) versus the starting stock solution. The prototype reduced the oil content from about an average of 146 ppm down to about ≤5 ppm (average), which is well under the desired specification of ≤29 ppm. The prototype lasted about 300 bed volumes before it became exhausted with oil and failed. After failure, it was regenerated in-situ (see Column Regeneration procedure described below) and the testing was resumed. The prototype resumed its oil removal performance for another 400 bed volumes before the prototype became exhausted and was regenerated a second time. After its second regeneration, it resumed its high oil removal performance for another 400 bed volumes before becoming exhausted. The prototype was regenerated a third time and lasted another 400 bed volumes before being exhausted. The prototype was regenerated a fourth time. After this regeneration, the granular prototype was starting to breakdown in the cartridge. It lasted about 200 bed volumes before the material because exhausted. This test confirmed that the Preferred ODC Prototype can be regenerated at least 4 times with 5 bed lives total.

Figure 2K:
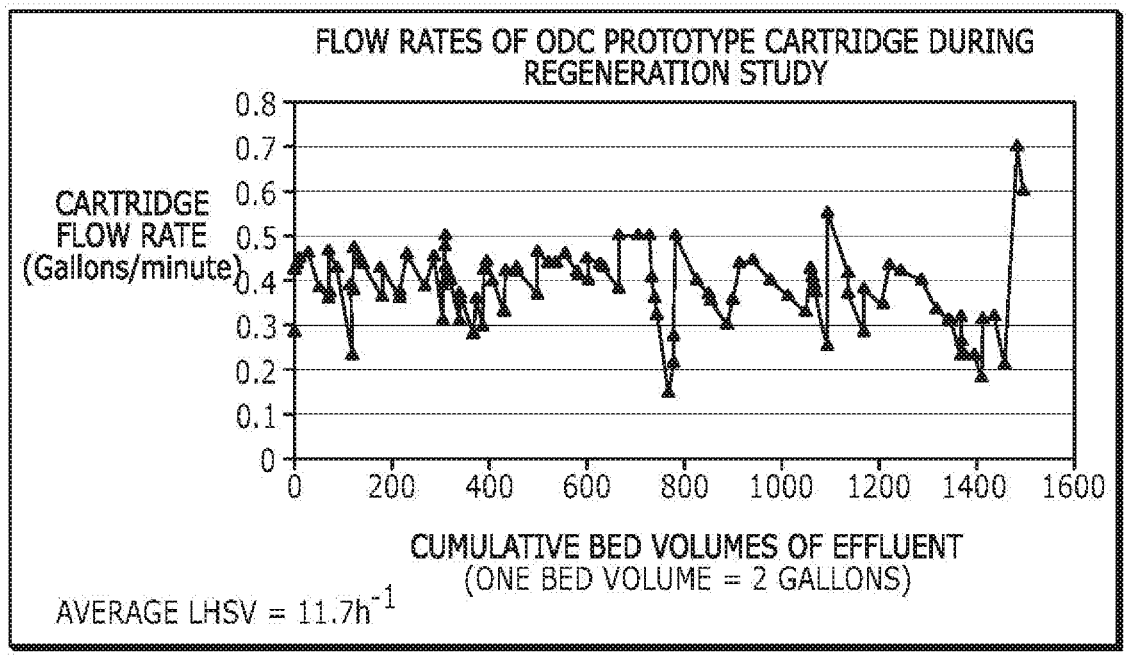
FIG. 2K depicts flow rates of preferred ODC prototype cartridge during regeneration study.

Flow rates of Preferred ODC Prototype cartridge during Regeneration Study. FIG. 2K shows the flow rates of the ODC Prototype cartridge during the Regeneration Study. It can be seen the flow rates remain high, averaging about 0.4 gal/minute. The LHSV (Liquid Hourly Space Velocity) averaged at about 11.7 $h^{-1}$. This means that about 11.7 bed volumes of emulsion were filtered through the cartridge per hour. This value exceeds the desired specification of LHSV of $8.0^{h-1}$. Even towards the end of the study when the Prototype material began to break down, the average LHSV was about $7.5^{h-1}$ which was just under the desired specification. This indicates the Prototype material was resistant to granule attrition for four bed lives before it started to break down during its fifth life.

FIELD TEST OF PREFERRED ODC PROTOTYPE. After the Pilot Plant cartridge testing, a field test was done in Taft, Calif. The Bakersfield and Taft areas of California are well known for oil drilling. The test site was located in Taft, Calif. at a water collection site (owner requests anonymity). At this site, the produced/brackish water is generated from oil production. It accompanies the crude oil as it is pumped from the oil well. After being separated from the crude oil, it is pumped to the water collection where it undergoes additional water separation (gravity separation) and then is stored in holding/storage tanks. The water at this collection site is corrosive, contains 80 ppm-300 ppm oil, and is hot (50° C.-60° C.).

This field study was designed based upon a water treatment system (used by a potential customer) that uses GAC (granular activated carbon) packed in bulk filtration vessels to polish their flow-back water. Their system currently experiences frequent change-outs of the GAC due to heavy hydrocarbons exhausting the carbon. The idea of this test study would be to use the ODC Prototype as a pre-treatment step before the GAC. It has always been hypothesized that the ODC Prototype removes heavy hydrocarbons over higher hydrocarbons. In theory, the ODC Prototype would remove the heavy hydrocarbons from the water first so that the GAC could focus on removing the lighter hydrocarbons from the water. Therefore, this field test was designed to be a double-filtration system where the water would pass through the first filtration vessel (containing the ODC Prototype) and then through the second vessel containing GAC.

Figure 2L:
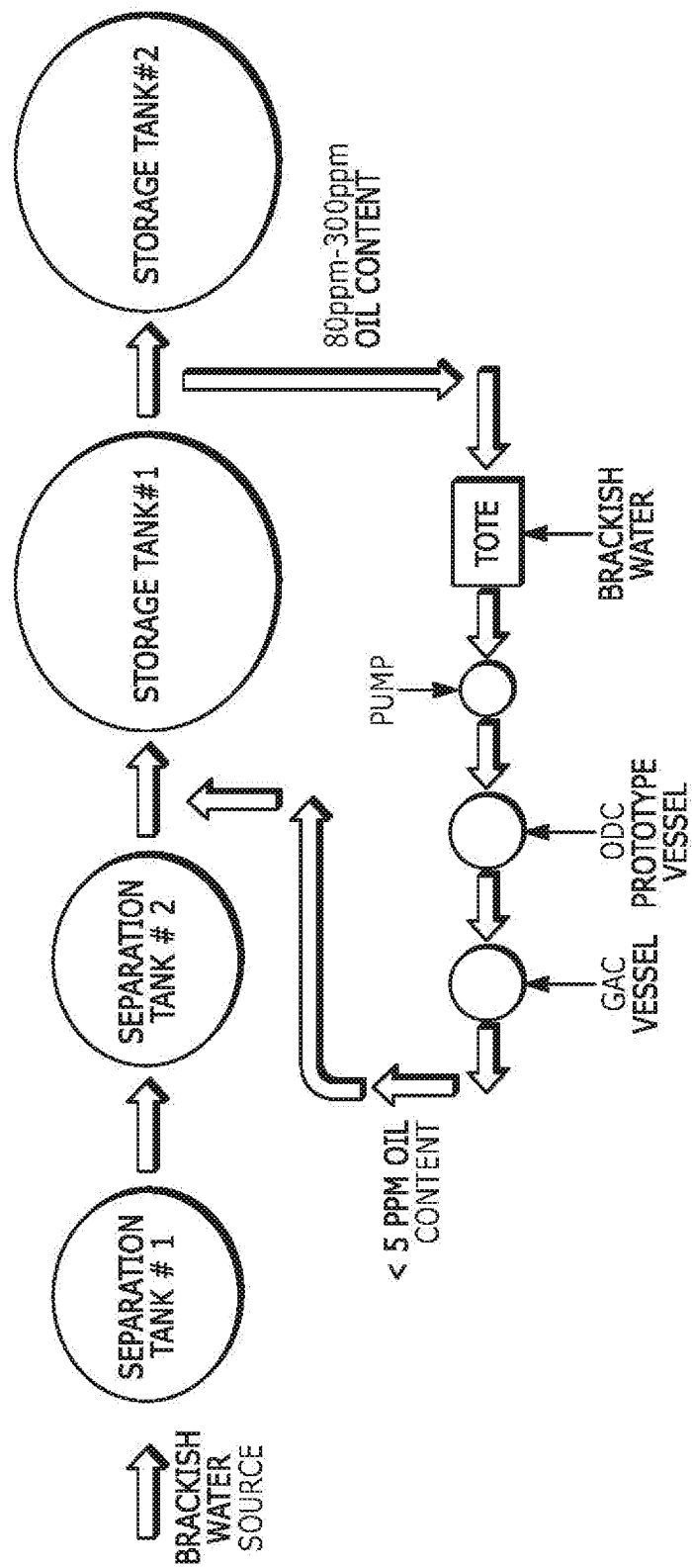
FIG. 2L depicts an overview of test site design.
Figure 2M:
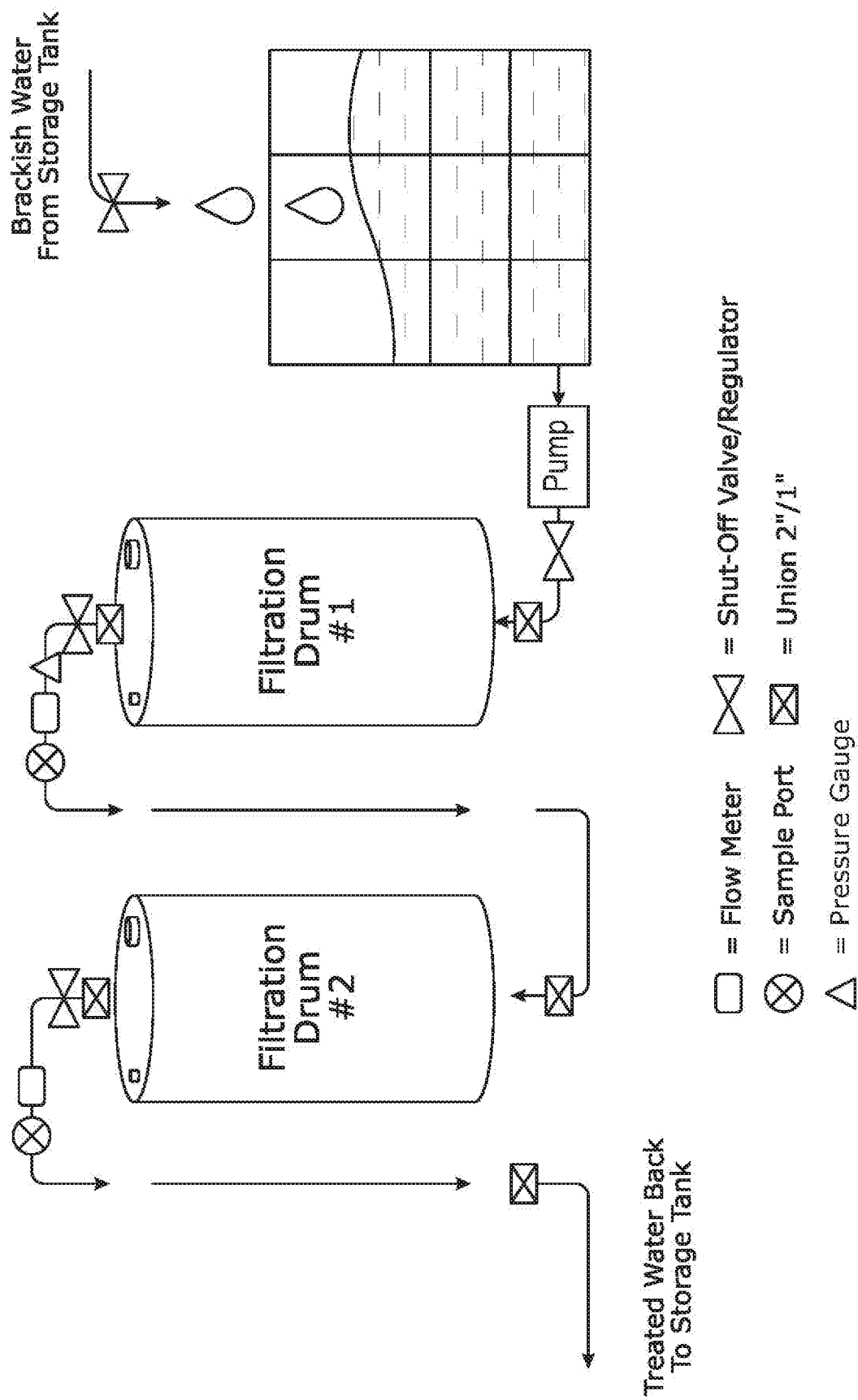
FIG. 2M depicts a side view illustration of test design.

FIG. 2L shows the location of the test site with respect to the water storage tanks. Water is routed from the storage tanks to the 275 gallon tote. A diaphragm pump is used to pump the water from the tote through the first filtration vessel containing the ODC Prototype. After passing through the first vessel, the water then flows through the second vessel containing the GAC. The water then gets routed back to the storage tank. FIG. 2M is a side illustration of how the water flows through the system. The water is pumped from the tote to the bottom of the first vessel (containing the ODC Prototype). The water is pumped upwards through the vessel (to prevent air pockets) and out the top of the vessel. The water is then sent downwards to the bottom of the second vessel (containing GAC) and then flows upward through the vessel. The treated water them comes out the top of the vessel and sent downwards to be diverted back to the storage tank. FIG. 2M shows all shutoff valves, unions, pressure gauges, flow meters, and sample ports. There were sample ports at the outflow pipes from both filtration vessels. The untreated brackish water was sampled from the tote. The test ran for 11 hours total.

The filtration vessels were packed and assembled according to the procedure illustrated in the APPENDIX (Example 2).

Figure 2N:
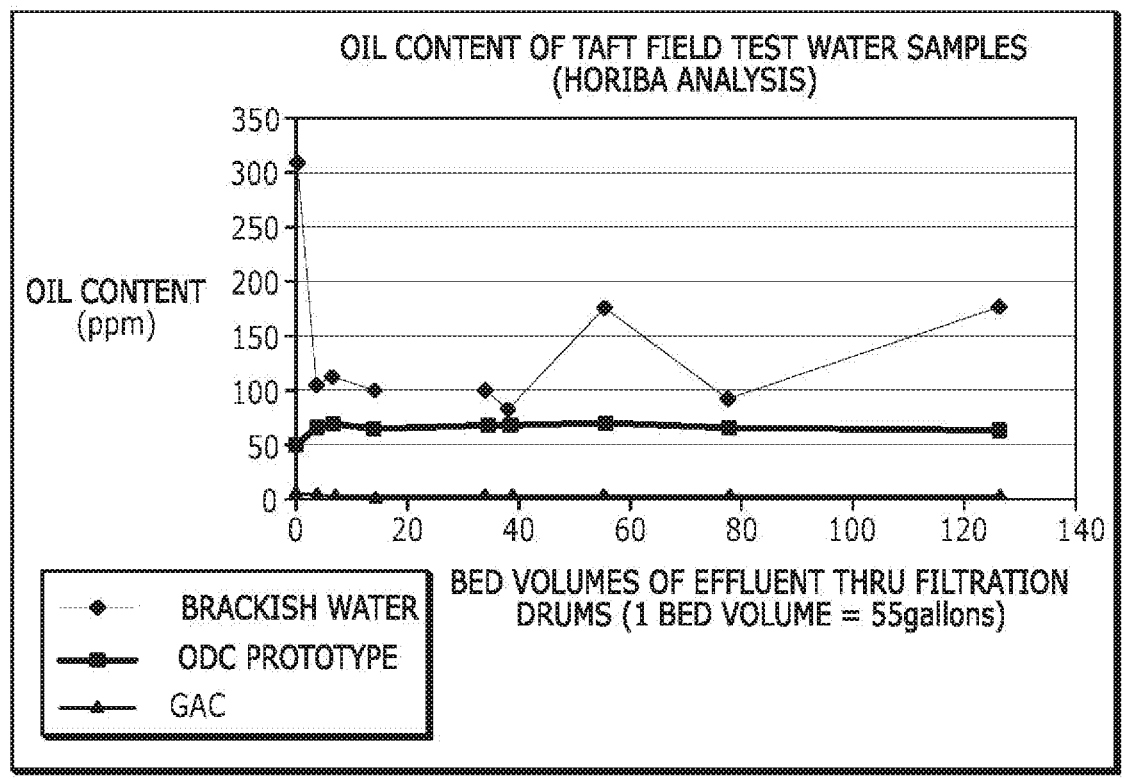
FIG. 2N depicts oil content of water samples tested on-site via Horiba Oil and Grease Analyzer.
Figure 2O:
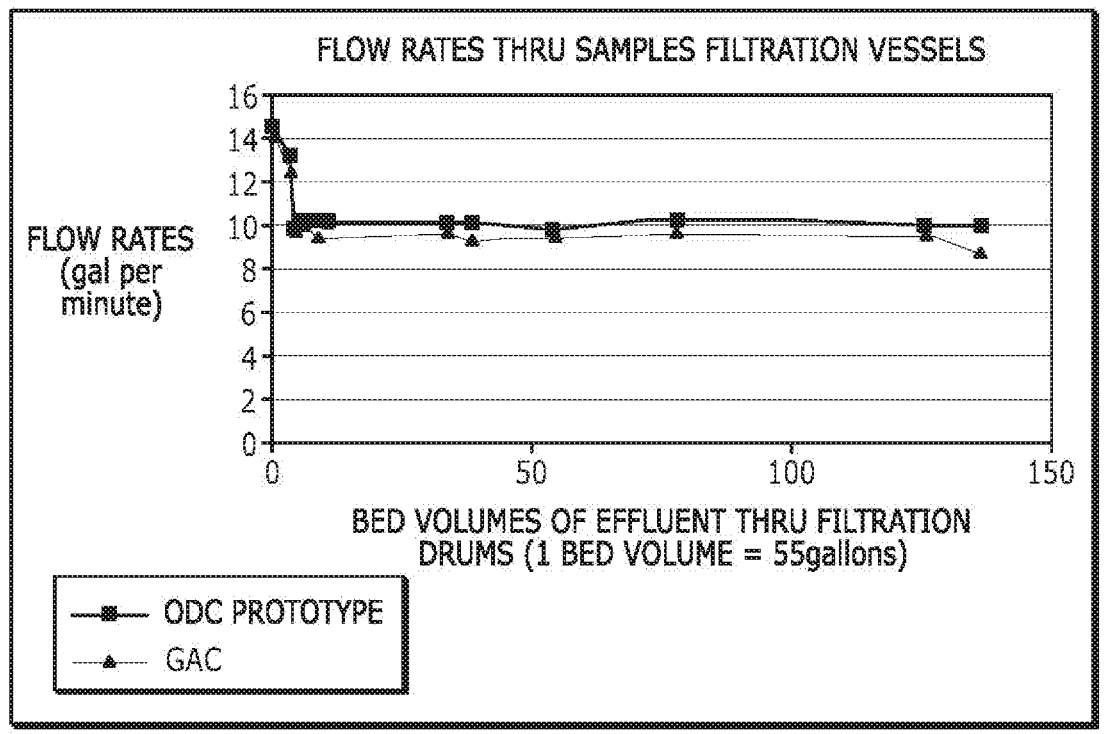
FIG. 2O depicts flow rates of the two filtration vessels during the study.

Oil content of water samples tested on-site via Horiba Oil and Grease Analyzer. FIG. 2N shows the oil and grease data of the samples taken during the study. These samples were tested on-site using a Horiba Oil and Grease Analyzer. It can be seen how the oil content is reduced by the ODC Prototype and the GAC follows up with the final removal. Although the brackish water had sharp spikes of oil, the ODC Prototype maintained consistent oil removal with the GAC polishing the remainder of oil. It should be noted, that the Horiba instrument uses S-316 solvent which extracts the oil and grease from water samples. However, this solvent also extracts other petroleum hydrocarbons and various organics as well. Although the data shows the ODC Prototype removing about 50% (average) oil from the brackish water, the Horiba data indicates there was still about 50% remaining in the water. This remainder appears to be lighter-weight hydrocarbons that Cesspool-W did not remove and can be better explained by the Total Petroleum Hydrocarbon (TPH) testing that was conducted by an outside lab (BC Laboratories) (see FIG. 2O).

Summarized test data for Total Petroleum Hydrocarbons (TPH).

| | Brackish Water 14 BV (1 Hr) | ODC Prototype 14 BV (1 Hr) | GAC 14 BV (1 Hr) | Brackish Water 126 BV (11 Hr) | ODC Prototype 126 BV (11 Hr) | GAC 126 BV (11 Hr) |
|---|---|---|---|---|---|---|
| Gasoline (mg/L) | 24.0 | 25.0 | Not Detected | 33.0 | 28 | 1.2 |
| Diesel (mg/L) | 25.0 | 3.3 | Not Detected | 30.0 | 19 | 0.9 |
| Hydraulic Oil/Motor Oil (mg/L) | 18.0 | Not Detected | Not Detected | 24.0 | Not Detected | 0.8 |
| Motor Oil (mg/L) | 18.0 | Not Detected | Not Detected | 24.0 | Not Detected | 0.8 |
| TOTAL PETROLEUM HYDROCARBONS | 85.0 | 28.3 | Not Detected | 111.0 | 47 | 3.7 |

The data in the table contains the summarized Total Petroleum Hydrocarbon (TPH) data from the Taft field study. The four analytes listed are ordered from the lightest weight hydrocarbons at the top, to the heavier-weight hydrocarbons at the bottom. Six water samples were submitted to the lab including three taken after 1 hour of testing and the other three taken at the end of the test (11 hours).

One Hour Samples: The table shows the brackish water (at 1 hour) had about 85 mg/L of TPH, of which 36 mg/L were heavier hydrocarbons (hydraulic and motor oil). While ODC Prototype had no effect on gasoline, it was able to lower diesel and reduce the heavy hydraulic and motor oil content to below detection. These results appear to coincide with the Horiba results (FIG. 2N) where the ODC Prototype removed 34 mg/L of oil (99−65=34) from the brackish water at one hour. This oil removed appears to be the heavier hydraulic and motor oil fractions. The data confirms the ODC Prototype works best at removing heavier-weight petroleum hydrocarbons while the GAC removes the lighter-weight petroleum hydrocarbons (gasoline and diesel).

Eleven Hour Samples: At 11 hours of testing, the brackish water became more severe with higher petroleum hydrocarbon levels. The water visually appeared to contain more oil, suspended solids, and was much darker in color. The ODC Prototype was still able to reduce the hydraulic and motor oil to below detection. The GAC was able to reduce remaining hydrocarbons to about 3.7 mg/L. The testing showed how Cesspool-W reduced the hydraulic and motor oil content to below detection, but after filtering through the GAC, the water had hydraulic and motor oil content 1.6 mg/L combined. This inconsistency could be due to "noise" and variation in the test itself.

In addition to Total Petroleum Hydrocarbons testing, VOC (Volatile Organic Compounds) testing was also done on the samples in the table.

VOC Test results of water samples.

the tote might not be the same water that has gone through either of the two vessels. Therefore, there might be some variations in the organic composition of all three samples collected at a given time.

Flow rates of the two filtration vessels during the study. As per the data in FIG. 2O, the flow rates through both vessels appeared to remain constant throughout the test. Although the flow rate through the second vessel (GAC) appeared to be slightly lower than the first Cesspool-W vessel, it still maintained steady flow rates. One reason why the flow rate through the GAC vessel was slightly lower could be due to some friction drag resulting from being pumped through two vessels of granular media using one pump. However, the difference between the two flow rates was small and their flow rates remained constant for the most part.

|  | Brackish Water 14 BV* | ODC Prototype 14 BV* | GAC 14 BV* | Brackish Water 126 BV* | ODC Prototype 126 BV* | GAC 126 BV* |
| --- | --- | --- | --- | --- | --- | --- |
| Benzene (mg/L) | 0.01 | 0.01 | Not Detected | 0.009 | 0.009 | Not Detected |
| Ethylbenzene (mg/L) | 0.004 | 0.004 | Not Detected | 0.003 | 0.004 | Not Detected |
| n-Propybenzene (mg/L) | 0.001 | Not Detected | Not Detected | Not Detected | 0.001 | Not Detected |
| Toluene (mg/L) | 0.005 | 0.005 | Not Detected | 0.005 | 0.006 | Not Detected |
| 1,2,4-Trimethylbenzene (mg/L) | 0.005 | 0.004 | Not Detected | 0.003 | 0.005 | Not Detected |
| 1,3,5-Trimethybenzene (mg/L) | 0.001 | 0.001 | Not Detected | Not Detected | 0.001 | Not Detected |
| Total Xylenes | 0.005 | 0.006 | Not Detected | 0.004 | 0.006 | Not Detected |
| Acetone (mg/L) | 7.2 | 7.4 | Not Detected | 6.1 | 4.4 | 6.3 |
| t-Butyl alcohol (mg/L) | Not Detected | 0.5 | Not Detected | Not Detected | Not Detected | 0.23 |
| Carbon disulfide (mg/L) | 0.003 | 0.003 | Not Detected | 0.004 | 0.006 | 0.001 |
| 2-Hexanone (mg/L) | 0.076 | 0.066 | Not Detected | 0.052 | Not Detected | Not Detected |
| Methyl ethyl ketone (mg/L) | 2.8 | 3.0 | Not Detected | 1.9 | 1.6 | 0.35 |
| Methyl isobutyl ketone (mg/L) | 0.022 | 0.017 | Not Detected | 0.022 | Not Detected | Not Detected |
| p-&m-Xylenes (mg/L) | 0.004 | 0.004 | Not Detected | 0.003 | 0.005 | Not Detected |
| o-Xylene (mg/L) | 0.002 | 0.002 | Not Detected | 0.001 | 0.002 | Not Detected |
| Total Purgeable Petroleum Hydrocarbons (mg/L) | 0.70 | 0.57 | Not Detected | 0.59 | 0.59 | 0.06 |

*BV = Bed Volumes of effluent, 1 BV = 55 gallons

The VOC Test results of water samples table contains the data from the Volatile Organic Compounds (VOC) Testing. Although the samples were scanned for numerous analytes, only the analytes that were present in the samples were listed. The data suggests that ODC Prototype does not efficiently remove volatile organic compounds from water. With the exception of 2-hexanone and methyl isobutyl ketone, ODC Prototype did not reduce the other volatile organic compounds. However, GAC was more efficient at removing the volatiles. After the first hour of testing, the GAC was able to reduce the volatile organics down to below detection. After 11 hours, the GAC was still able to remove most of the volatile organics. This data confirms that the ODC Prototype is most efficient at removing heavy petroleum hydrocarbons and less effective at removing volatile organics.

There are a few inconsistencies with the data from the VOCs testing. However, these inconsistencies might be due to test "noise" and sample collection. The brackish water that is pumped through the two vessels changes constantly since it is being constantly fed new brackish water from the storage tank. As the water level in the storage tank goes down the new water changes causing more changes and higher severity to the water in the holding tote. Also, at the set flow rate (10 gallons per minute), it takes water pumped at a given moment five minutes to pass through the first vessel (containing ODC Prototype) and an additional five minutes to pass through the second vessel (containing GAC). When taking samples, the brackish water taken from Pressure: A pressure gauge was inserted into the filtration system at the outflow union of the first vessel (ODC Prototype), just before the sample port. The pressure remained constant at two (2) psi throughout the duration of the test. This indicates there was very little pressure build up from the first filtration vessel that housed the ODC Prototype. The constant low pressure readings indicate the granular material had good integrity, allowing free flow through the material.

Figure 2P:
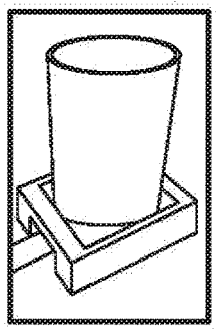
FIG. 2P depicts preparation of filtration vessel.
Figure 2P:
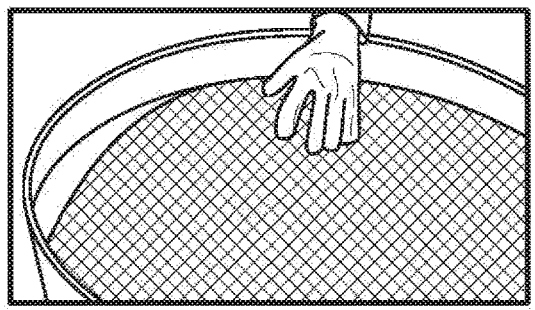
Figure 2P:
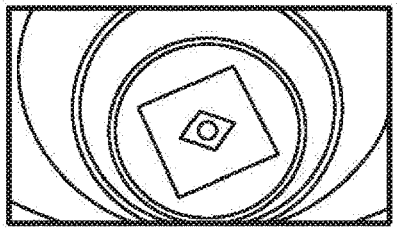
Figure 2P:
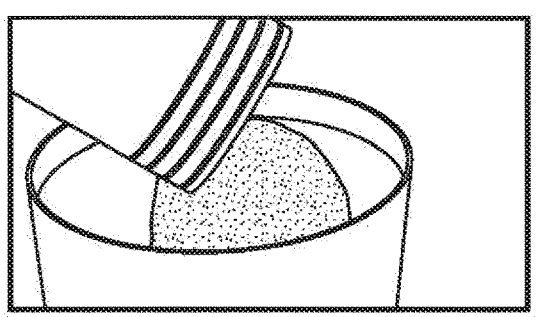
Figure 2P:
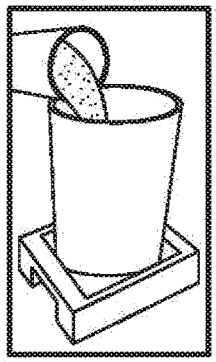
Figure 2P:
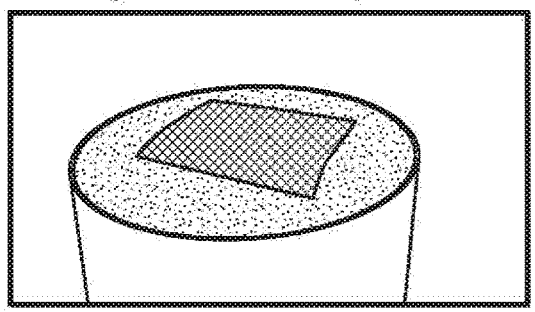
Figure 2P:
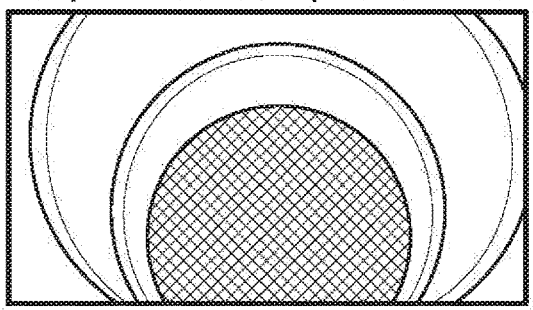
Figure 2P:
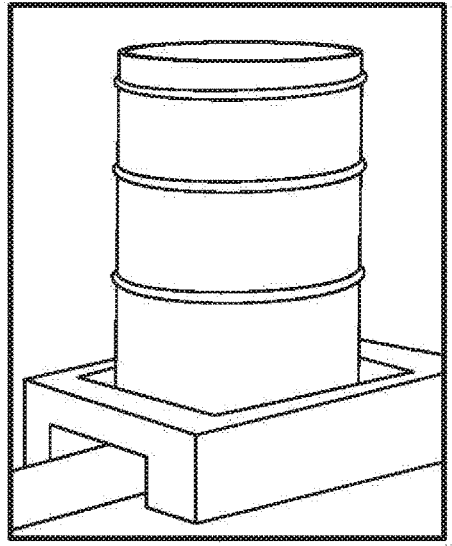
Figure 2P:
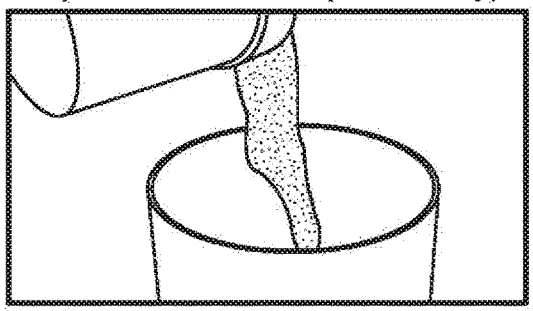
Figure 2Q:
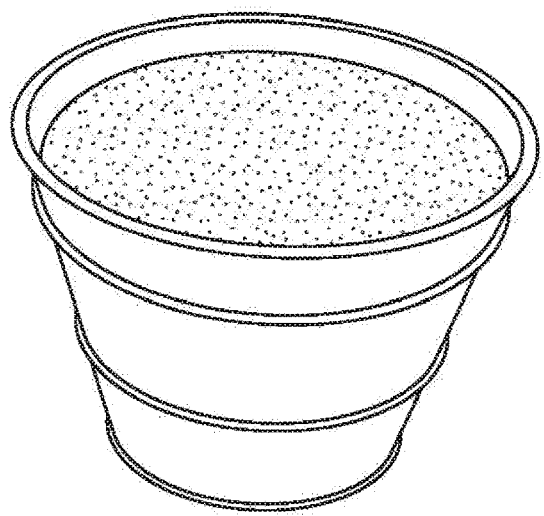
FIG. 2Q depicts ODC prototype material in vessel.
Figure 2Q:
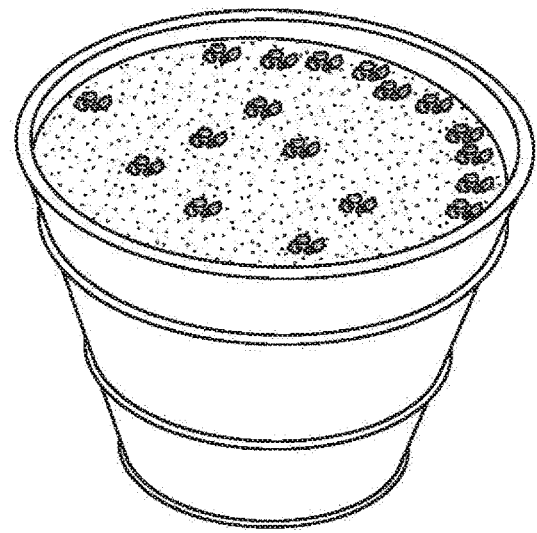
Figure 2Q:
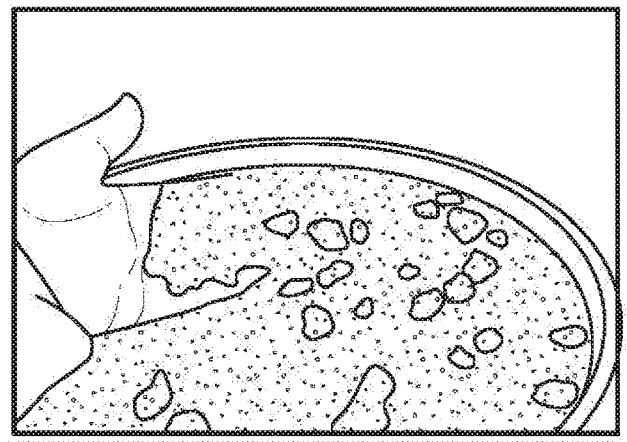

Granule Integrity and Visual Appearance at Test Termination: After the test study, the filtration vessels were drained and disassembled. When the top layer of gravel was removed from the ODC Prototype vessel, it was found that the granules appeared to be clean and without oil residues. As the clay was shoveled out of the barrel, the granules had good/firm granule integrity and did not stick together. Firm granular integrity is desired to maintain high flow rates. The pictures in FIG. 2Q shows good granule integrity after the test was completed.

Example 2: Appendix

Laboratory Column Test Procedures
Sample Column Procedure:
1. Clean and dry a glass Kontes Column (ID=2.5 cm, Length=20 cm) and the inflow cap. (Some caps might already have a screen inside.)
2. Label the sample ID number on the column using permanent marker.
3. Using a marker, place a line marker about 0.5"-1" up from the blue plastic of the column bottom end (this is the inflow end).

4. From this marker, carefully measure 4.5 inches above and place another marker line.
5. Wrap some Teflon tape around the threads of the open end of the column.
6. Drop a round stainless-steel screen (either 40 or 50 mesh cut to fit the diameter of the column) into the tube and position it snuggly into the inflow end of tube (or the tube bottom). Some tubes might already have a screen installed.
7. Pour enough clean and dry 4 mm glass beads into the column to fill up to the first line marker. Be sure beads are compacted.
8. Place another stainless-steel screen over the bead layer.
9. Place a 600 ml or 1 L beaker onto a balance (0.01 g) and tare.
10. Place the column with beads into the beaker and tare (or record the weight of the column with beads).
11. Pour enough granular test sample into the column (on top of the beads layer) to reach the 4.5 inch marker line.
12. Tap the sides and bottom of the column with hand or a spatula to compact the sample. Keep tapping until the sample is compacted.
13. Pour additional test sample into the column to reach the 4.5 inch marker line and tap again to compact.
14. Repeat Steps 13-15 until the sample is compacted at 4.5 Inch marker line.
15. Re-weigh the column in the beaker to determine the weight of sample in the column and record.
16. Place another stainless-steel screen over the clay layer.
17. Carefully pour more beads onto the sample and fill to the top with a little excess (mounded).
18. Carefully screw the inflow cap into the Teflon taped column threads (making sure mesh screen is inside the cap. (Cap is screwed down securely when the cap will not twist anymore). If the cap keeps twisting, it is not seated properly.)
19. Install luer-lock stop-cock valves at each end of the column and set them to the closed position.
20. Place column in a holder mounted on ring stand or a wall stand.
21. Attach a clean outflow tube to the outflow valve of the sample column (using luer-lock attachment) and run the tube into a one liter collection Erlenmeyer flask (marked with Sample ID).
22. Run an inflow tube from the test solution source, through a peristaltic pump, and label this tube with the sample ID. (Do not attach to the column yet.)
23. Repeat Steps 1 thru 22 with other samples (if any).

Running the Column Testing:
1. Prepare the test stock solution according to the test parameters and place into large source container. (see Emulsion Preparation Procedure).
2. Transfer the feeder-inflow tube end into the test stock solution source. Make sure the tubes are inserted deep enough into the solution so as not to fall out or dry up.
3. Conduct an initial pump flow rate on each tube (see Flow Rate Procedure section) and record. Turn off pump.
4. Attach each inflow tube to the column inflow valve (using luer-lock attachment) of the corresponding sample column. (For consistency throughout the testing, do not switch tubing or pump heads among the columns unless properly noted and tracked).
5. When all inflow tubes are attached to each column, open both the inflow and outflow valves of each sample column and turn on pump.
6. Observe the test solution as it percolates upwards thru each sample column.
7. Start the column running time on the timer when the first drops of column effluent fall into the Erlenmeyer flask. For convenience, if there are multiple sample columns, start all columns at the same time. You may need to close the inflow valve of the faster flowing samples until the slower samples catch-up.
8. After 5 minutes running time, collect samples from the stock solution and each effluent sample and run oil content analysis on them. Record results. Determine flow rates of each column at this time as well. Record the amount of effluent that was collected in the Erlenmeyer flask at this time.
9. For the first hour of running time, measure and record the oil content of both stock solution and sample effluents at 15, 30, 45 minutes and 60 minutes running time. Record the flow rates and effluent volume collected for each column at these time slots as well.
10. Be sure to measure and record the amount of effluent collected in the Erlenmeyer flasks at each time slot. After recording the effluent volume, discard the effluent in each flask.
11. Replenish stock solution as needed. Be sure to time or pattern the replenishment in accordance with column flow rates so that the columns do not go dry. Do not prepare oil stock solution too far in advance.
12. Measure and record the Oil Content (of the effluents), column flow rates, and effluent volumes every hour until the columns stabilize. Stabilization is determined when the columns have consistently low oil contents (~80%-95% removal) and even flow rates (10-15 mLs/minute) for about 4 straight hours.
13. After the sample columns stabilize, take the measurements (oil content, flow rate, and effluent volume) every 4 hours.
14. If any of the sample columns do not stabilize after 4-8 hours, check columns for defects in the column set-up and repair if possible. If it seems the sample material is inferior, discontinue these columns.
15. Run test for 6-8 hours per day.
16. At the end of the day, measure and record the final oil content, flow rates, and effluent volumes.
17. Turn both the inflow and outflow valves on each column end to the closed/locked position and detach the inflow tubes. Do NOT drain the columns at this point.
18. If the sample columns are stable, the testing can be continued through the night by preparing enough stock solution to last thru the night (at the current flow rate) and using a collection vessel large enough to contain the effluent during the night.

Continue the test the following days until the sample columns fail. Failure is designated by an oil content of ≤30 PPM in the effluent or a significant decrease in flow rate (less than 8 mL/minute). If the columns are to be regenerated, see the file on Column Regeneration.

Flow Rate Procedure:
This procedure should be conducted on the outflow tubes to obtain column flow rates.
1. Assemble a glass 100 ml graduated cylinder.
2. Place the tube end of the outflow tube into the cylinder and immediately start a timer set for at least 2 minutes.
3. Allow the fluid to collect into the cylinder.
4. After 2 minutes, remove the tube and note the volume of liquid collected.
5. Divide the volume collected by 2 to get the flow rate in mLs/min.

Column Regeneration Procedure:

This procedure is conducted when the test sample columns have failed or have become exhausted with oil.

1. Detach the current feeder tubing (used for the oil emulsion) from the column.
2. Open both valves at each end of the column and drain all liquid.
3. Install solvent resistant tubing at the outflow valve of column.
4. Place a clean tared (pre-weighed) 600 ml beaker at the outflow tube end of the column.
5. Using either the HPLC pump (with steel tubing) or peristaltic pump (with solvent resistant tubing), pump three bed volumes (200 mLs) of regeneration solvent (n-hexanes or hexanes) thru the column (flow rate set at 5-7 mLs/min). Allow the spent solvent to drain into the tared beaker.
6. Detach both the solvent feeder line and the outflow tubing from the column and drain any excess solvent from the column.
7. Move the column to a ring stand and clamp set-up in an exhaust hood.
8. Connect either a compressed air source or a vacuum source to the column inflow valve using air tubing. Open both the inflow and outflow valves.
9. Turn on the compressed air or draw a vacuum to allow air to flow thru the column for 4-16 hours or until the regenerated material appears dry. The airflow should be moderate.
10. Re-attach the oil emulsion feeder tubing and outflow tubing and resume column testing with the oil emulsion.
11. Place the tared beaker containing the spent regeneration solvent and dry under running exhaust until all solvent and any residual water is evaporated.
12. Weigh the beaker and calculate the amount of oil recovered from the column material. If desired the percentage of oil loaded onto the clay can be calculated as: Reclaimed Oil Weight/Dry Clay Weight in column× 100%.

Stock Oil Emulsion Preparation Procedure:

13. Assemble a high-shear blender (500-1000 mL capacity)
14. Fill blender with tap water to ½-¾ full.
15. Under blending medium speed, add 4%-5% sea water salt to the water.
16. Add enough crude oil to the blending water to bring oil content up to desire concentration (100-300 ppm).
17. Increase speed to highest and mix for 1-2 minutes.
18. Transfer the emulsion to a larger container and make more emulsion batches to desired quantity.

Pilot Plant Cartridge Testing

Sample Cartridge Vessel Preparation:

1. Clean and dry the filtration vessel.
2. Remove top cap from the vessel.
3. There should already be line markings on the vessel chamber walls that designate 10 inches between the markings.
4. Place a steel mesh screen at the bottom of vessel (inflow end). (The size of the mesh will depend upon the particle size of the test material.)
5. Fill the bottom of the vessel with clean dry pea gravel up to the lower line marking.
6. Tap and agitate the vessel to compact the gravel and top off with more gravel to reach the lower line marking.
7. Place another mesh screen on top of the gravel.
8. Tare the vessel on a high capacity balance.
9. Fill the vessel with test sample up to the upper line marking.
10. Tap or agitate the vessel to compact the test sample.
11. Pour more test sample up the line marking.
12. Repeat steps 10 thru 11 until the maximum amount of sample has been loaded up to the upper line marker.
13. Re-weigh the vessel on the tared balance to obtain and record the amount of test sample in the vessel.
14. Place a screen over the test sample.
15. Pour clean dry pea gravel onto the screen (covering the sample) in the vessel up to the top. (Be sure there is enough clearance to replace the cap.)
16. Place a screen on top of the gravel.
17. Place the upper gasket onto the rim of the vessel and position the vessel capo.
18. Tighten the bolts/wingnuts of the cap to seal the vessel.
19. Label the sample ID number on the vessel.
20. Attach a clean outflow hose tube to the outflow valve (top of vessel) of the filtration vessel and run the hose to a floor drain. (This outflow hose is where you can take samples of treated effluent and test flow rate.)
21. Place the vessel close to the inflow tube from the test solution source but do NOT connect yet.

Running the Pilot Plant Filtration Vessel Testing:

1. Prepare the stock test solution according to the test parameters and pump into large source container-55 gallon drum. (see Stock Emulsion Preparation Procedure).
2. Pre-calibrate the pump to the desired flow rate.
3. Position the filtration vessel (containing the test sample) in front of the inflow tube and connect to the inflow tube from the source of the test solution.
4. If a flow meter is available, connect it right before the outflow valve.
5. When securely connected, open both the inflow and outflow valves of the vessel.
6. Turn on the pump—keep the same flow rate setting.
7. Observe the test solution as it percolates upwards thru the sample chamber.
8. Start the filtration timer when the first drops of treated effluent are discharged from the outflow hose.
9. After 5 minutes running time, obtain samples of both the stock solution and treated effluent sample.
10. Check the flow rate of the test solution through the filtration vessel using the outflow hose and make adjustments to the pump rate to achieve desired flow rate.
11. If a flow meter is installed in the system, record the amount of solution has gone through the vessel.
12. Check and record the vessel pressure.
13. Analyze the collected samples for oil content.
14. For the first hour of running time, collect samples of both stock solution and sample effluents at 15, 30, and 60 minutes running time.
15. Measure and record the flow rates these times as well and monitor/record the pressure.
16. Measure and record the amount of stock solution that passes thru the vessel by monitoring the decreasing level of stock solution in the source 55 gallon drum.
17. Replenish stock solution as needed. Be sure to time or pattern the replenishment in accordance with the vessel flow rates so that the vessel does NOT go dry. If needed, stop the pump and close the shut-off valves while more stock solution is prepared. Once the stock emulsion has been replenished, open the valves and start the pump again. Do not prepare oil stock solution too far in advance either.
18. Measure and record flow rates, pressure and collect effluent and stock solution samples every hour until the material in the vessel stabilizes (usually after 1-2 hours). Stabilization is determined when the columns have consistently low oil contents (~80%-95% removal) and even flow rates (0.5 gal per min).
19. After the sample columns stabilize, take the measurements (oil content, flow rate, and effluent volume) every 4 hours.
20. If the sample does not stabilize after 4 hours, check vessel for defects in the set-up and repair if possible. If it seems the sample material is inferior, discontinue the test.
21. Run test for 6-8 hours per day.
22. At the end of the day, measure and record the final flow rate, pressure, total volume of solution through the cartridge, and take the last effluent and stock solution samples.
23. Turn off the pump and close the both the inflow and outflow valves of the vessel.
24. Allow to rest overnight—DO NOT DRAIN THE VESSEL.
25. Drain the 55 gallon stock solution vessel and rinse with water
26. Clean the mixer and any buckets, glassware, or hoses.

Continue the test the following days until the sample columns fail. Failure is designated by a significant increase in oil content in the effluent (≤29 ppm) or a significant decrease in flow rate. If the sample is to be regenerated, see the Cartridge Regeneration Procedure.

Flow Rate Procedure:

This procedure should be conducted at the cartridge outflow valve.
1. Tare a 1 graduated gallon container.
2. Hold the container under the outflow valve (which is open) and immediately start a timer.
3. Allow the fluid to collect into the container for 1 minute.
4. Remove the container from the effluent outflow and either read off the volume of water in the graduated container or reweigh the container to obtain the amount of effluent water.
5. The flow rate is the amount of water that is collected after one minute (mLs/min).

Preparing Crude Oil Stock Emulsion for Pilot Plant Cartridge Testing:

Preparing the crude oil emulsion involves mechanically emulsifying crude oil into simulated sea water using a high shear blunger mixer (The Big "H" Equipment Co., Model #H-10-1, Serial #77-822). This stock emulsion will be used in cartridge testing of ODC Prototype. The emulsion can also be used in lab column testing. Depending upon the flow rate and total volume of emulsion required, several batches might have to be prepared at regular intervals.
1. Be sure the large batch blunger mixer is clean (both the impeller blade and metal batch container must be clean).
2. Fill the metal mixer batch container with 70 liters of clean tap water.
3. Weigh out 2450 g of PETCO Premium Marine Salt or Instant Ocean Salt.
4. Turn the batch mixer on the slowest speed and gradually add the sea salt.
5. Mix for 1 minute or until all salt is dissolved. Keep the mixer agitating at this speed.
6. Draw up 15 cc of crude oil into a 20 cc syringe. Be sure to shake the crude oil container before filling the syringe.)
7. Slowly release the crude oil in the syringe into the agitating water at the vortex or the strongest agitating area. Be sure to empty all of crude oil out from the syringe.
8. Mix at the same slow speed for 1 minute.
9. Increase the speed up to the highest speed and continue mixing for at least 4 minutes. (Longer is okay.)
10. Pump the emulsion into the 55 gallon drum. (If the emulsion is to be used for column testing, transfer to a smaller container and move to the lab.)
11. For cartridge testing, prepare two more batches of emulsion and transfer to drum.
12. Take a sample of the composite emulsion for testing.
13. Start pumping the emulsion through the cartridge containing the prototype media at a rate of 0.5 gallons per minute.
14. Check on drum emulsion level every 1-1.5 hours and prepare more emulsion as necessary.
15. Check the treated effluent and take samples as per instructions.

Cartridge Regeneration Procedure:

This procedure is conducted when the granular media within the test sample cartridge has become exhausted with oil.
1. Detach the current feeder tubing (used for the oil emulsion) from the cartridge.
2. Open both valves at each end of the cartridge and drain all liquid.
3. Install solvent resistant tubing at both the inflow valve of cartridge and at the outflow.
4. Assemble a solvent resistant pumping system adjacent to the cartridge.
5. Pump three bed volumes (1 bed volume=volume of the cartridge) of regeneration solvent (n-hexanes or hexanes) thru the cartridge at half the flow rate that was used to pump the emulsion through the cartridge. Allow the spent solvent to drain into a solvent resistant container.
6. Detach both the solvent feeder line and the outflow tubing from the cartridge and drain any excess solvent from the cartridge. Add any excess waste solvent to the waste solvent container. Close both inflow and outflow valves of the cartridge.
7. Move the cartridge into an exhaust hood in the lab and connect air tubing from the inflow valve to the air valve in the hood. Open the cartridge inflow and outflow valves.
8. Turn on the exhaust fan in the hood.
9. Open the compressed air system regulator of the hood/lab to about 10-20 psi to allow air to flow through cartridge to dry out the granules. The airflow or psi will vary depending upon the size of the cartridge.
10. Allow air to flow thru the cartridge for 1-3 days or until the regenerated material appears dry. Keep the exhaust fan running in the hood during this time. When dry, the granules will appear intact and loose.
11. Return the cartridge to the pilot plant and re-insert into the filtration system. Resume cartridge testing with fresh emulsion.

The waste hexanes will be reclaimed using a rented solvent reclaimer. The solvent reclaimer uses distillation to vaporize the hexanes and a condenser to reconstitute the vapor into clean hexanes. The process leaves the oil that was removed by the clay granules and any residual water in a solvent and heat resistant bag. Any residual water in the reclaimed oil can be removed from the oil via air drying or siphoning and the oil can be weighed. To calculate the percent oil that was loaded onto the clay: Reclaimed Oil Weight/Dry Clay Weight×100%.

Taft Field Testing of the ODC Prototype

Overview: The purpose of this field test was to test the ODC Prototype in the field using produced/brackish water from an oil producer. Due to permitting issues, it was decided not to regenerate the ODC Prototype in this field study.

Samples Tested: The field test utilized a double filtration system where the two filtration vessels contained two different granular media; The ODC Prototype and GAC (granular activated carbon). The ODC Prototype was the Preferred Prototype Invention with a particle size of 8/30 mesh. The GAC was HYDRODARCO 3000 8/30 mesh (Cabot-Norit) and is commonly used in the water treatment industry Due to the high cost, it was decided not to regenerate the samples at this time.

Filtration Vessel Assembly: The filtration vessels used in this study were two high-gauge stainless steel 55 gallon drums that were modified with inflow and outflow fittings. The vessels were loaded with the granular sample media and pea gravel using the Vessel Loading Procedure listed further in this APPENDIX. Two more modified drums (black standard steel—not stainless steel) were used in the study to serve as the test vessels during the test/calibration stage. All four vessels were separately mounted onto individual crated base stands for stability in shipping and testing.

Tote: A 275 gallon tote was used to hold the brackish water received from the storage tank. The level of the brackish water was kept at three quarters full to reduce the effect of head pressure. The brackish water was pumped from the tote to the filtration vessels using an air operated diaphragm pump.

Pump system: The system was operated by Air-Powered 1" diaphragm transfer pump, connected to portable compressor unit. Make: Doosan Model: 185CFM. A portable compressor and forklift were rented from Hertz Equipment Rental in Taft. An air compressor regulator was used to lower the psi from 40 to 20 to set the flow at 10 gpm. The diaphragm pump was sufficient to pump the brackish water through two 55 gallon barrels containing ODC Prototype product and granulated activated carbon, respectively. The flow direction of the brackish water was from the bottom to the top of each barrel.

Pipe & fittings: First, 2" stainless steel pipe nipples were welded on the top and bottom of each barrel. Secondly, 1" reducers were installed to accommodate flowmeter requirements. The whole system was connected with thick-wall dark gray 1" and 2" NPT-threaded PVC pipe fittings: One inch flexible rubber hoses were used on the filtration system to compensate for the uneven terrain.

Flow meters and Pressure gauge: Flow was measured by two splash-resistant water flowmeters. One of the flowmeters was designed to monitor both flow rate and total flow volume in outdoor environments. Each flowmeter had a digital display and were mounted inline horizontally at the top barrel outlet. Barrel #1 was equipped with a pressure gauge. Pressure in Barrel #1 during the entire test was below 5 psi.

Sample Port: Sample ports for each barrel were installed for sample collection during testing.

Pre-Testing and Calibrating the System: Before the main test (with the ODC prototype and GAC), the system was pre-tested and calibrated using the two black standard filtration vessels filled with standard clay granules. The test vessels were inserted into the filtration system and all connecting pipes were fitted and sealed. The large tote was filled with produced/brackish water which was pumped through the vessels. The flow rate was monitored (using the flow meters) and adjusted by regulating air flow through the diaphragm pump. The flow was stabilized at 9-10 gallons per minute and the test was run for 30 minutes. After calibration, the stainless steel drums were loaded with the ODC Prototype and GAC and inserted into the filtration system.

Procedure for Assembling the 55 Gal Drum Filtration Vessels: (see FIGS. 2P and 2Q)
1. Assemble 55 gallon drum with fittings and chemical resistant gasket.
2. Place a square 12"×12" stainless steel 40 mesh screen over the drum base drain opening.
3. Pour washed pea gravel into the vessel to a depth of about 3-4 inches from the bottom (~40 lbs.).
4. Place a round 22"-23" diameter stainless steel 40 mesh stainless steel screen on top of gravel.
5. Pour 280-300 lbs. of prototype granular material into vessel on top the gravel up to 3-4 inches from top. Shake or vibrate the vessel several times during this step to achieve maximum dense packing.
6. Place another round 22"-23" diameter stainless steel 40 mesh stainless steel screen over sample.
7. Pour washed pea gravel on top of sample to just below top rim.
8. Place another square 12"×12" stainless steel 40 mesh screen was placed over the gravel.
9. Position the chemical resistant gasket on the rim of vessel.
10. Position top lid over gaskets and clamped down to seal.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A composition comprising a plurality of granules, each of the plurality of granules comprising a cementing agent comprising 6% to 12% by weight of the granule, a non-swelling clay comprising 48% to 87% of the granule, a silane comprising 2% to 5% of the granule, and water, wherein the non-swelling clay is a regular volatile material (RVM) clay having a moisture content of less than 20% by weight of the clay, wherein each of the plurality of granules have a particle size ranging between 600 microns to 2300 microns.

2. The composition of claim 1, wherein the cementing agent is calcium carbonate, dolomite or lime.

3. The composition of claim 1, wherein the cementing agent is a Portland cement.

4. The composition of claim 1, wherein the non-swelling clay is a Ripley, Blue Mountain, Mounds, Montmorillonite (Na+ or Ca++), Fullers Earth, Kaolin, Attapulgite or Sepiolite clay.

5. The composition of claim 1, wherein the clay comprises a blend of powdered attapulgite and Montmorillonite (Na+ or Ca++) clay.

6. The composition of claim 1, wherein the silane is a hexadecyltrimethoxysilane, ethyl silicate, tetraethyl silicate, glycidoxypropyl trimethoxysilane, organofunctional silane, octyltrimeth-oxysilane, octyltriethoxysilane or methyltrimeth-oxysilane.

7. The composition of claim 1, wherein the silane is octyltriethoxysilane.

8. The composition of claim 1, wherein the water is an acidic water, well water, tap water, purified water, or neutral water.

9. The composition of claim 1 further comprising isopropyl alcohol.

10. A method of manufacturing the composition claim 1, comprising mixing the cementing agent, non-swelling clay, silane and water, extruding the mixed cementing agent, non-swelling clay, silane and water, drying the extruded mixture and grinding and screening the dried extruded mixture.

11. A method of manufacturing the composition of claim 1, comprising mixing the cementing agent, non-swelling clay, silane and water, agglomerating the mixed cementing agent, non-swelling clay, silane and water, drying the agglomerated mixture and screening the dried agglomerated mixture.

12. The method of claim 11 wherein the drying is at about 105 C.

13. The method of claim 11 wherein the granules are screened within a range of −8, +30 mesh (2300μ–600μ).

14. A composition for filtration of hydrocarbons, the composition comprising: a plurality of granules, each of the plurality of granules comprising a cementing agent, a non-swelling clay, a silane, and water, wherein when a column test is performed on the composition such that an oily water emulsion flows through the composition resulting in a filtered liquid, the oily water emulsion has a flow rate of greater than or equal to 8 milliliters per minute, the composition has a bed life of at least 300 bed volumes, and the filtered liquid has less than or equal to 29 parts per million of oil.

15. The composition of claim 14, wherein the cementing agent comprises about 6% to about 12% by weight of the granule.

16. The composition of claim 14, wherein the non-swelling clay comprises about 48% to about 87% by weight of the granule.

17. The composition of claim 16, wherein the non-swelling clay is a regular volatile material (RVM) clay having a moisture content of less than 20% by weight of the granule.

18. The composition of claim 14, wherein the silane comprises about 2% to about 5% by weight of the granule.

* * * * *